United States Patent
Wakabayashi et al.

(10) Patent No.: US 7,605,220 B2
(45) Date of Patent: Oct. 20, 2009

(54) CURING COMPOSITION

(75) Inventors: Katsuyu Wakabayashi, Settsu (JP);
Toshihiko Okamoto, Akashi (JP);
Hiroshi Ando, Akashi (JP)

(73) Assignee: Kaneka Corporation, Osaka (JP)

( * ) Notice: Subject to any disclaimer, the term of this patent is extended or adjusted under 35 U.S.C. 154(b) by 165 days.

(21) Appl. No.: 10/555,416

(22) PCT Filed: Apr. 23, 2004

(86) PCT No.: PCT/JP2004/005954

§ 371 (c)(1),
(2), (4) Date: Nov. 3, 2005

(87) PCT Pub. No.: WO2004/099318

PCT Pub. Date: Nov. 18, 2004

(65) Prior Publication Data
US 2006/0252903 A1    Nov. 9, 2006

(30) Foreign Application Priority Data
May 12, 2003    (JP) .............................. 2003-132725

(51) Int. Cl.
*C08G 77/04*    (2006.01)
*C08G 77/08*    (2006.01)
*C08G 77/14*    (2006.01)

(52) U.S. Cl. ............................. 528/18; 528/14; 528/34; 528/35

(58) Field of Classification Search .................. 528/14, 528/34; 525/477
See application file for complete search history.

(56) References Cited

U.S. PATENT DOCUMENTS

| | | | |
|---|---|---|---|
| 3,632,557 A | 1/1972 | Brode et al. | |
| 3,661,817 A * | 5/1972 | Hamilton et al. ................ | 524/3 |
| 3,678,003 A * | 7/1972 | Kaiser et al. .................... | 528/34 |
| 3,857,825 A | 12/1974 | Streck et al. | |
| 3,888,815 A * | 6/1975 | Bessmer et al. ............. | 524/703 |
| 4,358,575 A * | 11/1982 | Lampe et al. .................. | 528/17 |
| 4,410,677 A * | 10/1983 | Lampe ......................... | 528/17 |
| 4,430,486 A * | 2/1984 | Chang et al. ................. | 525/127 |
| 4,449,938 A | 5/1984 | Pollak | |
| 4,490,500 A * | 12/1984 | Smith .......................... | 524/378 |
| 4,507,469 A * | 3/1985 | Mita et al. .................... | 528/425 |
| 4,559,387 A * | 12/1985 | Endo et al. ................... | 525/102 |
| 4,562,237 A * | 12/1985 | Okuno et al. ................. | 528/17 |
| 4,720,530 A * | 1/1988 | Wurminghausen et al. .... | 528/18 |
| 4,818,790 A * | 4/1989 | Ooka et al. ................... | 525/103 |
| 4,873,305 A | 10/1989 | Cavezzan et al. | |
| 4,904,732 A | 2/1990 | Iwahara et al. | |
| 4,910,255 A * | 3/1990 | Wakabayashi et al. ....... | 525/100 |
| 4,954,565 A * | 9/1990 | Liles ........................... | 524/860 |
| 4,960,844 A | 10/1990 | Singh | |
| 4,977,228 A * | 12/1990 | Wakabayashi et al. ......... | 528/12 |
| 5,084,543 A * | 1/1992 | Frances et al. ................. | 528/58 |
| 5,223,583 A | 6/1993 | Higuchi et al. | |
| 5,399,607 A | 3/1995 | Nanbu et al. | |
| 5,405,889 A * | 4/1995 | Hatanaka et al. ............. | 523/210 |
| 5,627,252 A * | 5/1997 | De La Croi Habimana ... | 528/26 |
| 5,639,825 A | 6/1997 | Nanbu et al. | |
| 5,659,001 A * | 8/1997 | de la Croi Habimana et al. ........................... | 528/17 |
| 5,807,921 A * | 9/1998 | Hill et al. ..................... | 524/837 |
| 5,908,895 A * | 6/1999 | Vogt-Birnbrich et al. .... | 524/591 |
| 5,986,014 A * | 11/1999 | Kusakabe et al. ............ | 525/342 |
| 6,166,121 A * | 12/2000 | Nishiumi et al. ............. | 524/425 |
| 6,204,350 B1 | 3/2001 | Liu et al. | |
| 6,255,373 B1 * | 7/2001 | Akamatsu et al. ............ | 524/188 |
| 6,271,309 B1 | 8/2001 | Roberts et al. | |
| 6,287,701 B1 | 9/2001 | Oochi et al. | |
| 6,288,143 B1 * | 9/2001 | Caradori et al. ............. | 523/213 |
| 6,350,345 B1 * | 2/2002 | Kotani et al. ................. | 156/329 |
| 6,407,146 B1 * | 6/2002 | Fujita et al. .................... | 522/99 |
| 6,410,640 B1 * | 6/2002 | Fukunaga et al. ............ | 524/588 |
| 6,486,289 B1 * | 11/2002 | Yamaguchi et al. ........... | 528/18 |
| 6,552,118 B2 * | 4/2003 | Fujita et al. .................. | 524/588 |
| 6,642,309 B2 | 11/2003 | Komitsu et al. | |
| 6,703,442 B1 * | 3/2004 | Ando et al. .................. | 524/588 |
| 6,720,373 B2 * | 4/2004 | Lin et al. ..................... | 524/284 |
| 6,884,852 B1 | 4/2005 | Klauck et al. | |
| 7,115,695 B2 * | 10/2006 | Okamoto et al. .............. | 528/14 |
| 7,351,782 B2 * | 4/2008 | Wakabayashi et al. ........ | 528/18 |

(Continued)

FOREIGN PATENT DOCUMENTS

DE    101 39 132 A1    2/2003

(Continued)

OTHER PUBLICATIONS

English-language abstract for DE 101 39 132.

*Primary Examiner*—Randy Gulakowski
*Assistant Examiner*—Robert Loewe
(74) *Attorney, Agent, or Firm*—Sughrue Mion, PLLC

(57) ABSTRACT

An object of the present invention is to provide a curing composition which is practically curable and highly adhesive even though a non-organotin compound is included as a curing catalyst. Problems involved are solved by a curing composition characterized by including (A) an organic polymer having one or more silicon-containing groups capable of cross linking by forming siloxane bonds, (B) a metal carboxylate and/or carboxylic acid, and (C) a silicon compound having a hetero atom on the carbon atom in the α or β position with respect to the silicon atom.

16 Claims, No Drawings

U.S. PATENT DOCUMENTS

| | | |
|---|---|---|
| 2002/0016411 A1 | 2/2002 | Ando et al. |
| 2002/0048680 A1* | 4/2002 | Yamanaka ................. 428/447 |
| 2002/0084030 A1* | 7/2002 | Kotani et al. ................. 156/329 |
| 2002/0086942 A1 | 7/2002 | Fujita et al. |
| 2002/0115811 A1 | 8/2002 | Huang et al. |
| 2003/0096904 A1 | 5/2003 | Hakuta et al. |
| 2004/0072921 A1* | 4/2004 | Stanjek et al. ............... 521/155 |
| 2004/0181025 A1* | 9/2004 | Schindler et al. .............. 528/38 |
| 2004/0198885 A1* | 10/2004 | Okamoto et al. ............ 524/394 |
| 2004/0204539 A1* | 10/2004 | Schindler et al. ............ 524/588 |
| 2005/0171315 A1* | 8/2005 | Wakabayashi et al. ......... 528/26 |
| 2006/0128919 A1* | 6/2006 | Okamoto et al. ............... 528/25 |
| 2006/0199933 A1* | 9/2006 | Okamoto et al. ............... 528/29 |
| 2006/0264545 A1* | 11/2006 | Wakabayashi et al. ...... 524/394 |
| 2007/0203297 A1 | 8/2007 | Wakabayashi et al. |
| 2008/0188624 A1 | 8/2008 | Yano et al. |
| 2008/0269405 A1 | 10/2008 | Okamoto et al. |

FOREIGN PATENT DOCUMENTS

| | | |
|---|---|---|
| EP | 0 473 793 A1 | 3/1992 |
| EP | 0 538 881 A2 | 4/1993 |
| EP | 0 546 310 A2 | 6/1993 |
| EP | 0 918 062 A1 | 5/1999 |
| EP | 1 000 980 A1 | 5/2000 |
| EP | 1 024 170 A1 | 8/2000 |
| EP | 1 041 119 A2 | 10/2000 |
| EP | 1 550 701 A1 | 7/2005 |
| JP | 52-073998 | 6/1977 |
| JP | 55-009669 A | 1/1980 |
| JP | 62-35421 B2 | 8/1987 |
| JP | 63-006003 A | 1/1988 |
| JP | 63-006041 A | 1/1988 |
| JP | 1-038407 A | 2/1989 |
| JP | 2-289642 A | 11/1990 |
| JP | 3-072527 A | 3/1991 |
| JP | 3-197548 A | 8/1991 |
| JP | 4-292616 A | 10/1992 |
| JP | 5-039428 A | 2/1993 |
| JP | 5-117519 A | 5/1993 |
| JP | 5-125272 A | 5/1993 |
| JP | 6-322251 A | 11/1994 |
| JP | 8-231758 A | 9/1996 |
| JP | 2000-109678 A | 4/2000 |
| JP | 3062626 B2 | 7/2000 |
| JP | 2000-345054 A | 12/2000 |
| JP | 2001163918 A * | 6/2001 |
| JP | 2001172515 A * | 6/2001 |
| JP | 2001-181532 A | 7/2001 |
| JP | 2001-342363 A | 12/2001 |
| JP | 2002155201 A * | 5/2002 |
| WO | WO 99/48942 A1 | 9/1999 |

\* cited by examiner

CURING COMPOSITION

RELATED APPLICATION

This application is a national stage of PCT application PCT/JP2004/005954 filed on Apr. 23, 2004, claiming priority to Japanese Application No. 2003-132725 filed on May 12, 2003.

TECHNICAL FIELD

The present invention relates to a curing composition including an organic polymer which has silicon-containing groups (hereinafter also referred to as "reactive silicon groups") having one or more hydroxyl or hydrolyzable groups bonded to the silicon atom or atoms and capable of cross linking by forming siloxane bonds.

BACKGROUND ART

Organic polymers each containing at least one reactive silicon group in the molecule thereof are known to have interesting characteristics such that they are cross-linked even at room temperature by forming siloxane bonds accompanied by hydrolysis reaction of the reactive silicon groups due to the moisture or the like to yield a rubber-like cured substance.

Among such reactive silicon group-containing organic polymers, polyoxyalkylene polymers and polyisobutylene polymers are disclosed in Japanese Patent Laid-Open Nos. 52-73998, 5-125272, 3-72527, 63-6003, 63-6041, 1-38407, 8-231758 and the like, and have already been manufactured industrially and have been widely used in applications as sealants, adhesives, painting materials and the like.

Curing compositions which contain these reactive silicon group-containing organic polymers are cured by use of silanol condensation catalysts; usually, organotin catalysts having carbon-tin bonds such as dibutyltin bisacetylacetonate are widely used. Curing compositions using organotin catalysts are generally excellent in curability and yield cured substances tending to undergo stress relaxation. However, in these years alternative catalysts are demanded from the viewpoint of the environmental protection. Additionally, catalytic systems free from the heavy metals of the fourth period or higher in the periodic table are demanded.

As such non-organotin catalysts, divalent tin carboxylates and bismuth carboxylates and other various metal carboxylates have been proposed as described in Japanese Patent Laid-Open No. 55-9669, Japanese Patent No. 3062626, and Japanese Patent Laid-Open Nos. 6-322251 and 2000-345054.

Additionally, among curing catalysts free from heavy metals are catalytic systems concomitantly using carboxylic acids and amine compounds as described in Japanese Patent Laid-Open No. 5-117519.

However, when the catalysts described in the aforementioned patents involving the metal carboxylates and carboxylic acids are used, there has been a problem that the curability is lower and the adhesion is also somewhat lower than when organotin catalysts are used.

On the other hand, Japanese Patent Laid-Open Nos. 2000-345054 and 5-117519 and Japanese Patent Publication No. 62-35421 describe the regulation of the adhesion, that of the tensile physical properties of the cured substances and the like by the addition of amino group-substituted alkoxysilanes. However, in these aforementioned patents, there is found no specific description on the addition of a silicon compound which has a hetero atom on the carbon atom in the α or β position with respect to the silicon atom, and there are also neither description nor suggestion on the effects of such silicon compounds.

DISCLOSURE OF THE INVENTION

The present invention takes as its object the provision of a curing composition which includes a reactive silicon group-containing organic polymer as a main component, and exhibits practical curability and is satisfactory in adhesion even though a non-organotin compound is used as curing catalyst.

The present inventors made intensive investigations in an attempt to solve the problems mentioned above and consequently found that a curing composition having practical curability is obtained when a silicon compound having a specific structure is used together with the curing catalyst for the organic polymer concerned. On the basis of this finding, the present invention has been achieved.

More specifically, the present invention relates to a curing composition which includes (A) an organic polymer having one or more silicon-containing groups capable of cross linking by forming siloxane bonds, (B) a metal carboxylate and/or carboxylic acid, and (C) a silicon compound having a hetero atom on the carbon atom in the α or β position with respect to the silicon atom.

In a further preferred embodiment, the present invention relates to the curing composition according to the above description, in which the organic polymer as the component (A) has a number average molecular weight falling within a range from 500 to 50000, and has on average one or more silicon-containing groups per molecule thereof, each of the silicon-containing groups represented by the general formula (1):

$$-(SiR^1{}_{2-b}X_bO)_l-SiR^2{}_{3-a}X_a \qquad (1)$$

wherein $R^1$ and $R^2$ are each independently an alkyl group having 1 to 20 carbon atoms, an aryl group having 6 to 20 carbon atoms, an aralkyl group having 7 to 20 carbon atoms, or a triorganosiloxy group represented by $(R')_3SiO-$, wherein R's are each independently a substituted or unsubstituted hydrocarbon group having 1 to 20 carbon atoms; Xs are each independently a hydroxyl or hydrolyzable group; a represents 0, 1, 2 or 3 and b represents 0, 1 or 2 with the proviso that a and b are not simultaneously 0; and l represents 0 or an integer of 1 to 19.

In another preferred embodiment, the present invention relates to the curing composition according to the above description, in which X is an alkoxy group.

In another preferred embodiment, the present invention relates to the curing composition according to any of the above descriptions, wherein the organic polymer as the component (A) is one or more polymers selected from the group consisting of a polyoxyalkylene polymer, a saturated hydrocarbon polymer and a (meth)acrylate polymer.

In another preferred embodiment, the present invention relates to the curing composition according to the above description, wherein the polyoxyalkylene polymer is a polyoxypropylene polymer.

In another preferred embodiment, the present invention relates to the curing composition according to any of the above descriptions, wherein the organic polymer as the component (A) does not substantially include amide segments in the main chain skeleton thereof.

In another preferred embodiment, the present invention relates to the curing composition according to any of the above descriptions, wherein the component (B) is a metal carboxylate and/or carboxylic acid in which the carbon atom adjacent to the carbonyl group constituting the carboxylic acid is a quaternary carbon atom.

In another preferred embodiment, the present invention relates to the curing composition according to any of the above descriptions, wherein the component (B) is tin carboxylate.

In another preferred embodiment, the present invention relates to the curing composition according to any of the above descriptions, wherein the component (B) is carboxylic acid.

In another preferred embodiment, the present invention relates to the curing composition according to any of the above descriptions, wherein the component (C) is a silicon compound represented by the general formula (2):

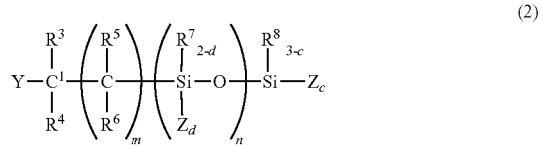

(2)

wherein $R^3$ to $R^6$ are each independently a hydrogen atom, or a substituted or unsubstituted monovalent hydrocarbon group having 1 to 20 carbon atoms; $R^7$ and $R^8$ are each independently an alkyl group having 1 to 20 carbon atoms, an aryl group having 6 to 20 carbon atoms, an aralkyl group having 7 to 20 carbon atoms, or a triorganosiloxy group represented by $(R'')_3SiO$—, wherein $R''$s are each independently a substituted or unsubstituted monovalent hydrocarbon group having 1 to 20 carbon atoms; Y is a substituent bonded to an adjacent carbon atom ($C^1$) through a hetero bond; Zs are each independently a hydroxyl or hydrolyzable group; c represents 0, 1, 2 or 3 and d represents 0, 1 or 2 with the proviso that c and d are not 0 simultaneously; m represents 0 or 1; and n represents 0 or an integer of 1 to 19.

In another preferred embodiment, the present invention relates to the curing composition according to the above description, wherein Y in the general formula (2) is a hetero substituent represented by —$NR^9_2$, —$OR^{10}$ or —$SR^{11}$, wherein two $R^9$s, $R^{10}$ and $R^{11}$ are each independently a hydrogen atom or a substituted or unsubstituted monovalent hydrocarbon group, or by —N=$R^{12}$ wherein $R^{12}$ is a substituted or unsubstituted divalent hydrocarbon group.

In another preferred embodiment, the present invention relates to the curing composition according to the above description, wherein Y in the general formula (2) is a nitrogen substituent represented by —$NR^9_2$ or —N=$R^{12}$ wherein $R^9$s and $R^{12}$ are the same as described above.

In another preferred embodiment, the present invention relates to the curing composition according to any of the above descriptions, wherein m in the general formula (2) is 0.

In another preferred embodiment, the present invention relates to the curing composition according to any of the above descriptions, in which the curing composition includes 0.01 to 20 parts by weight of the component (B) and 0.01 to 20 parts by weight of the component (C) in relation to 100 parts by weight of the component (A).

In another preferred embodiment, the present invention relates to the curing composition according to any of the above descriptions, in which the curing composition further includes an amine compound as a component (D).

In another preferred embodiment, the present invention relates to the curing composition according to the above description, in which the curing composition includes 0.01 to 20 parts by weight of the component (D) in relation to 100 parts by weight of the component (A).

In another preferred embodiment, the present invention relates to a one-part curing composition which includes the curing composition according to any of the above descriptions.

BEST MODE FOR CARRYING OUT THE INVENTION

In the following, the present invention will be described in detail.

No particular constraint is imposed on the main chain skeleton of the reactive silicon group-containing organic polymer to be used in the present invention, and accordingly, organic polymers having various main chain skeletons may be used as the polymer concerned.

Specific examples of such organic polymers may include: polyoxyalkylene polymers such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as ethylene-propylene copolymer, polyisobutylene, copolymers of isobutylene with isoprene and the like, polychloroprene, polyisoprene, copolymers of isoprene or butadiene with acrylonitrile and/or styrene or the like, polybutadiene, copolymers of isoprene or butadiene with acrylonitrile and styrene or the like and hydrogenated polyolefin obtained by hydrogenating these polyolefin polymers; polyester polymers obtained by condensation of glycol with dibasic acids such as adipic acid or obtained by ring-opening polymerization of lactones; (meth)acrylate polymers obtained by radical polymerization of monomers such as ethyl (meth)acrylate and butyl (meth)acrylate; vinyl polymers obtained by radical polymerization of (meth)acrylate monomers, vinyl acetate, acrylonitrile and styrene; graft polymers obtained by polymerization of vinyl monomers in the above described organic polymers; polysulfide polymers; polyamide polymers such as nylon 6 obtained by ring-opening polymerization of ε-caprolactam, nylon 6/6 by polycondensation between hexamethylene diamine and adipic acid, nylon 6/10 by polycondensation between hexamethylene diamine and sebacic acid, nylon 11 by polycondensation of ε-aminoundecanoic acid, nylon 12 by ring-opening polymerization of ε-aminolaurolactam, and copolymer nylons including at least two components selected from the nylons mentioned above; polycarbonate polymers prepared by polycondensation of, for instance, bisphenol A and carbonyl chloride; and diallyl phthalate polymers. Among the polymers having the above described main chain skeletons, polyoxyalkylene polymers, hydrocarbon polymers, polyester polymers, (meth)acrylate polymers and polycarbonate polymers are preferable from the viewpoints of easy availability and easiness in production.

Further, saturated hydrocarbon polymers such as polyisobutylene, hydrogenated polyisoprene and hydrogenated polybutadiene, polyoxyalkylene polymers and (meth)acrylate polymers are particularly preferable from the viewpoint that they each have a relatively low glass transition temperature and the obtained cured substances are each excellent in low-temperature resistance.

The reactive silicon group contained in the reactive silicon group-containing organic polymer has at least one hydroxyl or hydrolyzable group bonded to a silicon atom, and is a group capable of cross linking by forming at least one siloxane bond through a reaction accelerated by a silanol condensation catalyst. As the reactive silicon group, there may be cited a group represented by the general formula (1):

wherein $R^1$ and $R^2$ are each independently an alkyl group having 1 to 20 carbon atoms, an aryl group having 6 to 20 carbon atoms, an aralkyl group having 7 to 20 carbon atoms, or a triorganosiloxy group represented by $(R')_3SiO—$, wherein R's are each independently a substituted or unsubstituted hydrocarbon group having 1 to 20 carbon atoms; Xs are each independently a hydroxyl or hydrolyzable group; a represents 0, 1, 2 or 3 and b represents 0, 1 or 2 with the proviso that a and b are not simultaneously 0; and 1 represents 0 or an integer of 1 to 19.

No particular constraint is imposed on the hydrolyzable group, as long as it is a hydrolyzable group well known in the art. Specific examples of the hydrolyzable group may include: a hydrogen atom, a halogen atom, an alkoxy group, an acyloxy group, a ketoximate group, an amino group, an amide group, an acid amide group, an aminooxy group, a mercapto group and an alkenyloxy group. Among these groups, a hydrogen atom, an alkoxy group, an acyloxy group, a ketoximate group, an amino group, an amide group, an aminooxy group, a mercapto group and an alkenyloxy group are preferable, and an alkoxy group is particularly preferable from the viewpoints of moderate hydrolyzability and easiness in handling.

One to three hydrolyzable and/or hydroxyl groups are able to be bonded to one silicon atom, and (a+Σb) preferably falls within a range from 1 to 5. When two or more hydrolyzable and/or hydroxyl groups are bonded in a reactive silicon group, they may be the same or different.

At least one silicon atom constitutes the reactive silicon group; however, in the case of the silicon atoms connected with each other by siloxane bonds or the like, it is preferable that 20 or less silicon atoms constitute the reactive silicon group.

In particular, the reactive silicon group represented by the general formula (3) is preferable because of easy availability:

wherein $R^2$ and X are the same as described above, and e represents an integer of 1 to 3.

Specific examples of $R^1$ and $R^2$ in the above described general formulas (1) and (3) may include: alkyl groups such as a methyl group and an ethyl group; cycloalkyl groups such as a cyclohexyl group; aryl groups such as a phenyl group; aralkyl groups such as a benzyl group; and triorganosiloxy groups represented by $(R')_3SiO—$ wherein R' is a methyl group, a phenyl group or the like. Among these, a methyl group is particularly preferable.

More specific examples of the reactive silicon group may include: a trimethoxysilyl group, a triethoxysilyl group, a triisopropoxysilyl group, a dimethoxymethylsilyl group, a diethoxymethylsilyl group and a diisopropoxymethylsilyl group. From the viewpoint of high activity and obtainable satisfactory curability, a trimethoxysilyl group, a triethoxysilyl group and a dimethoxymethylsilyl group are more preferable, and a trimethoxysilyl group is particularly preferable. From the viewpoint of the storage stability, a dimethoxymethylsilyl group is particularly preferable. A triethoxysilyl group is particularly preferable because the alcohol produced by the hydrolysis reaction of the reactive silicon group is ethanol and hence a triethoxysilyl group has a higher safety.

The introduction of the reactive silicon group can be carried out by means of methods well known in the art. Examples of such methods may include the following:

(a) With an organic polymer having in the molecule functional groups such as hydroxyl groups, an organic compound having an active group exhibiting reactivity to the functional groups and having an unsaturated group is reacted, to yield an unsaturated group-containing organic polymer. Alternatively, an unsaturated group-containing organic polymer is obtained by copolymerization with an epoxy compound having an unsaturated group. Then, a reactive silicon group-containing hydrosilane is reacted with the thus obtained reaction product to be hydrosilylated.

(b) With an unsaturated group-containing organic polymer, obtained similarly to the method described in (a), a mercapto group- and reactive silicon group-containing compound is reacted.

(c) With an organic polymer having in the molecule functional groups such as hydroxyl groups, epoxy groups and isocyanate groups, a compound having a functional group exhibiting reactivity to the functional groups and having a reactive silicon group is reacted.

Among the above methods, a method described in (a) or a method described in (c) in which a hydroxyl group-terminated organic polymer is reacted with an isocyanate group- and reactive silicon group-containing compound is preferable because the method provides a high conversion rate for a relatively short reaction time. Additionally, the method described in (a) is particularly preferable because a reactive silicon group-containing organic polymer obtained by the method described in (a) gives a curing composition lower in viscosity and more satisfactory in workability than an organic polymer obtained by the method described in (c), and an organic polymer obtained by the method described in (b) is strong in odor due to mercaptosilane.

Specific examples of the hydrosilane compound used in the method described in (a) may include halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; and ketoximatesilanes such as bis(dimethylketoximate)methylsilane and bis(cyclohexylketoximate) methylsilane; however, the hydrosilane compound used in the method described in (a) is not limited to these compounds. Among these examples, halogenated silanes and alkoxysilanes are preferable; in particular, alkoxysilanes are most preferable because the obtained curing compositions are moderately hydrolyzable and easily handlable. Among the alkoxysilanes, methyldimethoxysilane is particularly preferable because methyldimethoxysilane is easily available, and the curability, storage stability, elongation property, and tensile strength of the curing composition containing the obtained organic polymer are high.

Examples of the synthesis method described in (b) may include a method in which a mercapto group- and reactive silicon group-containing compound is introduced into the sites on the unsaturated bonds of an organic polymer by means of a radical addition reaction in the presence of a radical initiator and/or a radical generating source; however, the synthesis method concerned is not limited to these methods. Examples of the above described mercapto group- and reactive silicon group-containing compound may include γ-mercaptopropyltrimethoxysilane, γ-mercaptopropylmethyldimethoxysilane, γ-mercaptopropyltriethoxysilane and γ-mercaptopropylmethyldiethoxysilane; however, the mercapto group- and reactive silicon group-containing compound is not limited to these compounds.

Examples of the method, one of the synthesis methods described in (c), in which a hydroxyl group-terminated organic polymer is reacted with an isocyanate group- and reactive silicon group-containing compound may include a method disclosed in Japanese Patent Laid-Open No. 3-47825; however, the method concerned is not limited to these methods. Examples of the above described isocyanate group- and reactive silicon group-containing compound may include γ-isocyanatepropyltrimethoxysilane, γ-isocyanatepropylmethyldimethoxysilane, γ-isocyanatepropyltriethoxysilane, and γ-isocyanatepropylmethyldiethoxysilane; however, the compound concerned is not limited to these compounds.

Silane compounds each having three hydrolyzable groups bonded to one silicon atom such as trimethoxysilane sometimes undergo proceeding disproportionation reaction, which yields fairly hazardous compounds such as dimethoxysilane. However, with γ-mercaptopropyltrimethoxysilane and γ-isocyanatepropyltrimethoxysilane, no such reaction proceeds. Accordingly, when as the silicon-containing group, there is used a group having three hydrolyzable groups bonded to one silicon atom such as a trimethoxysilyl group, it is preferable to use the synthesis method described in (b) or (c).

The reactive silicon group-containing organic polymer may be a linear chain or may have branches, and the number average molecular weight thereof, measured by GPC relative to polystyrene standards, is preferably 500 to 50,000, and more preferably 1,000 to 30,000, furthermore preferably 4,000 to 30,000, and most preferably 7,000 to 25,000. When the number average molecular weight is less than 500, there is found an adverse trend involving the elongation property of the cured substance, while when the number average molecular weight exceeds 50,000, there is found an adverse trend involving the workability because the viscosity becomes high.

The proportion of the component (A) in the curing composition of the present invention is preferably 20 wt % or more and more preferably 30 wt % or more, in relation to all the components thereof exclusive of the filler contained therein. When the proportion is less than the above lower limit, a cured substance having a high strength, a high elongation and a low elastic modulus is hardly obtained.

For the purpose of obtaining a rubber-like cured substance having a high strength, a high elongation and a low elastic modulus, it is recommended that the number of the reactive groups contained in the reactive silicon group-containing organic polymer is at least one, on average in one polymer molecule, and preferably 1.1 to 5. When the average number of the reactive groups contained in one molecule is less than 1, the curability becomes insufficient, and hence a satisfactory rubber elasticity behavior can hardly be exhibited. The reactive silicon group may be located at the terminals or in the interior of the polymer molecular chain, or both at the terminals and in the interior. In particular, when the reactive silicon groups are located at the molecular terminals, the effective network-chain length in the polymer component contained in the finally formed cured substance becomes large, so that it becomes easier to obtain a rubber-like cured substance having a high strength, a high elongation and a low elastic modulus.

The above described polyoxyalkylene polymer is essentially a polymer having the repeating units represented by the general formula (4):

$$—R^{13}—O—\qquad(4)$$

wherein $R^{13}$ is a substituted or unsubstituted divalent hydrocarbon group which has 1 to 14 carbon atoms and is a linear chain or branched alkylene group. In the general formula (4), $R^{13}$ is preferably a linear chain or branched alkylene group having 1 to 14 carbon atoms, and more preferably 2 to 4 carbon atoms. Examples of the repeating units represented by the general formula (4) may include:

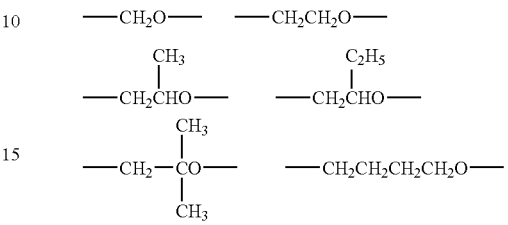

The main chain skeleton of the polyoxyalkylene polymer may be formed of either only one type of repeating unit or two or more types of repeating units. In particular, in the case where the polymer is used for a sealant and the like, it is preferable that the main chain skeleton is formed of a polymer containing as the main component a propyleneoxide polymer because a polymer having such a main chain skeleton is amorphous and relatively low in viscosity.

Examples of the synthesis method of the polyoxyalkylene polymer may include a polymerization method based on an alkaline catalyst such as KOH; a polymerization method based on a transition metal compound-porphyrin complex catalyst such as a complex prepared by reacting an organoaluminum compound with porphyrin, disclosed in Japanese Patent Laid-Open No. 61-215623; polymerization methods based on double metal cyanide complex catalysts, disclosed in Japanese Patent Publication Nos. 46-27250 and 59-15336, and U.S. Pat. Nos. 3,278,457, 3,278,458, 3,278,459, 3,427,256, 3,427,334, 3,427,335 and the like; a polymerization method using a catalyst composed of a polyphosphazene salt disclosed in Japanese Patent Laid-Open No. 10-273512, and a polymerization method using a catalyst composed of a phosphazene compound disclosed in Japanese Patent Laid-Open No. 11-060722. However, the method concerned is not limited to these methods.

The main chain skeleton of the above described polyoxyalkylene polymer may include other components such as urethane bond components as long as such inclusion does not largely impair the advantageous effect of the present invention.

No particular constraint is imposed on the above described urethane bond component; examples of the urethane bond-containing component may include the compounds obtained by the reaction between the polyols having the repeating units represented by the above general formula (4) and polyisocyanate compounds covering aromatic polyisocyanates such as toluene (tolylene) diisocyanate, diphenylmethane diisocyanate and xylene diisocyanate; and aliphatic polyisocyanates such as isophorone diisocyanate and hexamethylene diisocyanate.

When amide segments (—$NR^{14}$—CO—) contained in the (thio)urethane bonds, urea bonds, substituted urea bonds and the like produced in the main chain skeleton on the basis of the above described urethane reaction are abundant, $R^{14}$ being a hydrogen atom or a substituted or unsubstituted monovalent hydrocarbon group, the viscosity of the organic polymer becomes high and forms a composition poor in workability as the case may be. Accordingly, the amount of the amide segments occupying the main chain skeleton of the organic polymer is preferably 3 wt % or less, more preferably 1 wt % or less, and most preferably substantially null.

Examples of the manufacturing method of the reactive silicon group-containing polyoxyalkylene polymer may include the methods disclosed in Japanese Patent Publication Nos. 45-36319 and 46-12154, Japanese Patent Laid-Open Nos. 50-156599, 54-6096, 55-13767, 55-13468, 57-164123, Japanese Patent Publication No. 3-2450, and U.S. Pat. Nos. 3,632,557, 4,345,053, 4,366,307 and 4,960,844; and the manufacturing methods of polyoxyalkylene polymers each having a molecular weight as high as 6,000 or more and a molecular weight distribution Mw/Mn as narrow as 1.6 or less, disclosed in Japanese Patent Laid-Open Nos. 61-197631, 61-215622, 61-215623, 61-218632, 3-72527, 3-47825 and 8-231707. However, the method concerned is not limited to these methods.

The above described reactive silicon group-containing polyoxyalkylene polymers may be used each alone or in combinations of two or more thereof.

The above described saturated hydrocarbon polymers are the polymers which contain substantially no carbon-carbon unsaturated bonds other than aromatic rings; the polymers forming the skeletons of the saturated hydrocarbon polymers can be obtained by the methods in which (1) olefin compounds having 1 to 6 carbon atoms such as ethylene, propylene, 1-butene and isobutylene as main monomers are polymerized, and (2) diene compounds such as butadiene and isoprene are homopolymerized or copolymerized with the above described olefin compounds and then hydrogenation is applied; however, isobutylene polymers and hydrogenated polybutadiene polymers are preferable because functional groups can be easily introduced into the terminals of these polymers, the molecular weights of these polymers can be easily controlled and the number of the terminal functional groups can be increased; and isobutylene polymers are particularly preferable because of the ease of the synthesis thereof.

The polymers having saturated hydrocarbon polymers as the main chain skeleton are characterized by being excellent in heat resistance, weather resistance, durability and moisture blocking property.

The isobutylene polymers may be formed in such a way that all the monomer units are solely isobutylene units, or may be copolymers with monomers other than isobutylene units; however, from the viewpoint of the rubber property, in each of the polymers concerned, the content of the repeating unit derived from isobutylene is preferably 50 wt % or more, more preferably 80 wt % or more, and particularly preferably 90 to 99 wt %.

As for the synthesis methods of saturated hydrocarbon polymers, various types of polymerization methods have hitherto been reported, particularly among which are many so-called living polymerization methods developed in these years. It has been known that the saturated hydrocarbon polymers, in particular, the isobutylene polymers can be easily produced by use of the inifer polymerization discovered by Kennedy et al. (J. P. Kennedy et al., J. Polymer Sci., Polymer Chem. Ed., Vol. 15, p. 2843 (1997)) in such a way that polymers having the molecular weights about 500 to 100,000 can be polymerized with the molecular weight distribution of 1.5 or less and various types of functional groups can be introduced into the molecular terminals thereof.

The manufacturing methods of the reactive silicon group-containing saturated hydrocarbon polymers are described, for example, in Japanese Patent Publication Nos. 4-69659 and 7-108928, Japanese Patent Laid-Open Nos. 63-254149, 64-22904 and 1-197509, Japanese Patent Nos. 2539445 and 2873395, Japanese Patent Laid-Open No. 7-53882 and the like; however, the methods concerned are not particularly limited to these methods.

The above described reactive silicon group-containing saturated hydrocarbon polymers may be used each alone or in combinations of two or more thereof.

No particular constraint is imposed on the (meth)acrylate monomers constituting the main chains of the above described (meth)acrylate polymers, and various types can be used. Examples of the monomers concerned may include (meth)acrylic acid monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxylethyl (meth)acrylate, 2-hydroxylpropyl (meth)acrylate, stearyl (meth)acrylate, glycidyl (meth)acrylate, 2-aminoethyl (meth)acrylate, γ-(methacryloyloxypropyl)trimethoxysilane, ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, trifluoromethyl (meth)acrylate, bis(trifluoromethly)methyl (meth)acrylate, 2-trifluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate. For the above described (meth)acrylate polymers, (meth)acrylate monomers can be copolymerized with the following vinyl monomers. Examples of the vinyl monomers concerned may include styrene monomers such as styrene, vinyltoluene, α-methylstyrene, chlorostyrene, and styrenesulfonic acid and the salts thereof; fluorine-containing vinyl monomers such as perfluoroethylene, perfluoropropylene and fluorinated vinylidene; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allyl alcohol. These monomers may be used each alone or two or more of these monomers may be copolymerized. Among these, from the viewpoint of the physical properties and the like of the products, organic polymers formed of styrene monomers and (meth)acrylic acid monomers are preferable. More preferable are the (meth)acrylic polymers formed of acrylate monomers and methacrylate monomers, and particularly preferable are the acrylic polymers formed of acrylate monomers. For general construction applications, the butyl acrylate monomers are further preferable because compositions concerned are each required to have physical properties including a low viscosity, and the cured substances are each required to have physical properties including a low modulus, a high elongation, a weather resistance and a heat resistance. On the other hand, for applications to vehicles and the like where oil resistance is demanded, copolymers made of ethyl acrylate as the main material are further preferable. The polymers made of ethyl acrylate as the main material are excellent in oil resistance, but slightly tend to be poor in low-temperature property (low-temperature resistance); for the purpose of improving the low-temperature property thereof, part of ethyl acrylate can be replaced with butyl acrylate. However, with the increase of the ratio of butyl acrylate, the satisfactory oil resistance comes to be degraded, so that for the application to the use requiring oil resistance, the ratio of butyl acrylate is set preferably at 40% or less, and more preferably at 30% or less. Additionally, it is also preferable to use 2-methoxyethyl acrylate and 2-ethoxyethyl acrylate which have side chain alkyl groups containing oxygen atoms introduced for the purpose of improving the low-temperature property and the like without degrading the oil resistance; in this connection, it is to be noted that the introduction of alkoxy groups having an ether bond in the side chains tends to degrade the heat resistance, so that the ratio of such an acrylate is preferably 40% or less when heat resistance is demanded. It is possible to obtain appropriate organic polymers by varying the ratio in consideration of the demanded physical properties such as oil resistance, heat resistance and low-temperature property according to the various applications and the demanded objectives. Examples of the polymers excellent in the balance between the physical properties such as the oil resistance, heat resistance and low-temperature property may include a copolymer of ethyl acrylate/butyl acrylate/2-methoxyethyl acrylate (40 to 50/20 to 30/30 to 20 in ratio by weight), this copolymer imposing no constraint on the polymers concerned. In the present invention, these preferable monomers can be copolymerized with other monomers, and moreover, block copolymerized with other monomers; in such cases, it is preferable that the preferable monomers are contained in 40% or more in ratio by weight. Incidentally, it is to be noted that in the above form of presentation, for example, "(meth)acrylic acid" means acrylic acid and/or methacrylic acid.

No particular constraint is imposed on the synthesis methods of the (meth)acrylate polymers, and the methods well known in the art can be applied. However, organic polymers obtained by the usual free radical polymerization methods using azo compounds and peroxides as polymerization initiators have a problem such that the molecular weight distribution values of the organic polymers are generally as large as 2 or more and the viscosities of the polymers are high. Accordingly, it is preferable to apply living radical polymerization methods for the purpose of obtaining (meth)acrylate polymers being narrow in molecular weight distribution and low in viscosity, and moreover, having cross linking functional groups at the molecular chain terminals thereof in a high ratio.

Among "the living radical polymerization methods," "the atom transfer radical polymerization method" in which (meth)acrylate monomers are polymerized by use of an organic halogenated compound or a halogenated sulfonyl compound as an initiator and a transition metal complex as a catalyst has, in addition to the features of the above described "living radical polymerization methods," features such that the method concerned provides halogen atoms, at the terminals of obtained polymers, relatively favorable for the functional group conversion reaction and the method concerned is large in freedom for designing the initiator and the catalyst, so that the atom transfer radical polymerization method is further preferable as a method for manufacturing (meth)acrylate polymers having particular functional groups. Examples of the atom transfer radical polymerization method may include the method reported by Matyjaszewski et al. in Journal of the American Chemical Society (J. Am. Chem. Soc.), Vol. 117, p. 5614 (1995).

As a manufacturing method of a reactive silicon group-containing (meth)acrylate polymer, for example, Japanese Patent Publication Nos. 3-14068 and 4-55444, and Japanese Patent Laid-Open No. 6-211922 and the like disclose manufacturing methods which apply the free radical polymerization methods using chain transfer agents. Additionally, Japanese Patent Laid-Open No. 9-272714 and the like disclose a manufacturing method which applies the atom transfer radical polymerization method. However, the manufacturing method concerned is not limited to these methods.

The above described reactive silicon group-containing (meth)acrylate polymers may be used each alone or in combinations of two or more thereof.

These reactive silicon group-containing organic polymers may be used each alone or in combinations of two or more thereof. Specifically, there can be used organic polymers formed by blending two or more polymers selected from the group consisting of the reactive silicon group-containing polyoxyalkylene polymers, the reactive silicon group-containing saturated hydrocarbon polymers, and the reactive silicon group-containing (meth)acrylate polymers.

The manufacturing methods of the organic polymers formed by blending the reactive silicon group-containing polyoxyalkylene polymers with the reactive silicon group-containing (meth)acrylate polymers are proposed in Japanese Patent Laid-Open Nos. 59-122541, 63-112642, 6-172631, 11-116763 and the like. However, the manufacturing method concerned is not limited to these methods. A preferable specific example is a manufacturing method in which a reactive silicon group-containing polyoxyalkylene polymer is blended with a reactive silicon group-containing copolymer having the molecular chain substantially formed of two (meth)acrylate monomer units: one is the (meth)acrylate monomer unit having an alkyl group having 1 to 8 carbon atoms and represented by the following general formula (5):

wherein $R^{15}$ represents a hydrogen atom or a methyl group, and $R^{16}$ represents an alkyl group having 1 to 8 carbon atoms; and the other is the (meth)acrylate monomer unit having an alkyl group having 10 or more carbon atoms and represented by the following formula (6):

wherein $R^{15}$ is the same as above and $R^{17}$ represents an alkyl group having 10 or more carbon atoms.

In the above general formula (5), examples of $R^{16}$ may include alkyl groups having 1 to 8 carbon atoms, preferably 1 to 4 carbon atoms and further preferably 1 to 2 carbon atoms such as a methyl group, an ethyl group, a propyl group, a n-butyl group, a t-butyl group and a 2-ethylhexyl group. It is also to be noted that $R^{16}$ may represent either one type or admixtures of two or more types.

In the above general formula (6), examples of $R^{17}$ may include long chain alkyl groups having 10 or more carbon atoms, usually 10 to 30 carbon atoms, and preferably 10 to 20 carbon atoms such as a lauryl group, a tridecyl group, a cetyl group, a stearyl group and a behenyl group. It is also to be noted that $R^{17}$ may represent, similarly to $R^{16}$, one type or admixtures of two or more types.

The molecular chains of the above described (meth)acrylate copolymers are substantially formed of the monomer units represented by formulas (5) and (6): "substantially" as referred to here means that in the copolymer concerned the sum content of the monomer unit of formula (5) and the monomer unit of formula (6) exceeds 50 wt %. The sum content of the monomer units of formulas (5) and (6) is preferably 70 wt % or more.

Additionally, the ratio by weight of the monomer unit of formula (5) to the monomer unit of formula (6) is preferably 95:5 to 40:60, and further preferably 90:10 to 60:40.

Examples of the monomer units other than the monomer units of formulas (5) and (6) which may be contained in the above described copolymer may include acrylic acids such as acrylic acid and methacrylic acid; amide group-containing monomers such as acrylamide, methacrylamide, N-methylolacrylamide and N-methylolmethacrylamide, epoxy group-containing monomers such as glycidylcacrylate and glycidyl methacrylate, and amino group-containing monomers such as diethylaminoethyl acrylate, diethylaminoethyl methacrylate and aminoethyl vinyl ether; and monomer units derived from acrylonitrile, styrene, α-methylstyrene, alkyl vinyl ethers, vinyl chloride, vinyl acetate, vinyl propionate, ethylene and the like.

The organic polymers formed by blending a reactive silicon group-containing saturated hydrocarbon polymer with a reactive silicon group-containing (meth)acrylate copolymer are proposed in Japanese Patent. Laid-Open Nos. 1-168764, 2000-186176 and the like. However the organic polymer concerned is not limited to these organic polymers.

Moreover, for the manufacturing method of the organic polymers formed by blending the (meth)acrylate copolymers having the reactive silicon functional groups, there can be used additional methods in which (meth)acrylate monomers are polymerized in the presence of a reactive silicon group-containing organic polymer. These manufacturing methods are disclosed specifically in Japanese Patent Laid-Open Nos. 59-78223, 59-168014, 60-228516, 60-228517 and the like. However, the method concerned is not limited to these methods.

In the present invention, as the component (B), a metal carboxylate (B1) and/or carboxylic acid (B2) is used. The component (B) functions as a so-called silanol condensation catalyst capable of forming siloxane bonds from the hydroxyl groups or hydrolyzable groups each bonded to a silicon atom contained in the organic polymer as the component (A).

As the metal carboxylate (B1), because of high catalytic activity, preferable are tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates and cerium carboxylates; more preferable are tin carboxylates, lead carboxylates, bismuth carboxylates, titanium carboxylates, iron carboxylates and zirconium carboxylates; and particularly preferable are tin carboxylates and most preferable are divalent tin carboxylates.

As the carboxylic acids having the acid radicals of the metal carboxylates, preferably used are compounds containing hydrocarbon based carboxylic acid radicals each having 2 to 40 carbon atoms inclusive of the carbonyl carbon atom(s); because of availability, hydrocarbon based carboxylic acids having 2 to 20 carbon atoms are particularly preferably used.

Specific examples may include: linear chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, montanic acid, melissic acid and lacceric acid; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid and 10-undecenoic acid; polyene unsaturated fatty acids such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nishinic acid and docosahexaenoic acid; branched fatty acids such as 2-methylbutyric acid, isobutyric acid, 2-ethylbutyric acid, isovaleric acid, tuberculostearic acid, pivalic acid, neodecanoic acid and 2-phenylbutyric acid; triple bond-containing fatty acids such as propiolic acid, tariric acid, stearolic acid, crepenynic acid, ximenynic acid and 7-hexadecynoic acid; alicyclic carboxylic acids such as naphthenic acid, malvalic acid, sterculic acid, hydnocarpic acid, chaulmoogric acid and gorlic acid; oxygen-containing fatty acids such as acetoacetic acid, ethoxy acetic acid, glyoxylic acid, glycolic acid, gluconic acid, sabinic acid, 2-hydroxyltetradecanoic acid, ipurolic acid, 2-hydroxylhexadecanoic acid, jalapinolic acid, juniperic acid, ambrettolic acid, aleuritic acid, 2-hydroxyloctadecanoic acid, 12-hydroxyloctadecanoic acid, 18-hydroxyloctadecanoic acid, 9,10-dihydroxyloctadecanoic acid, ricinoleic acid, camlolenic acid, licanic acid, pheronic acid and cerebronic acid; and halogen-substituted monocarboxylic acids such as chloroacetic acid, 2-chloroacrylic acid and chlorobenzoic acid. Examples of aliphatic dicarboxylic acids may include: saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid; and unsaturated dicarboxylic acids such as maleic acid, fumaric acid, acetylenedicarboxylic acid and itaconic acid. Examples of aliphatic polycarboxylic acids may include: tricarboxylic acids such as aconitic acid, citric acid and isocitric acid. Examples of aromatic carboxylic acids may include: aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid and pyromellitic acid. Additional other examples may include amino acids such as alanine, leucine, threonine, aspartic acid, glutamic acid, arginine, cysteine, methionine, phenylalanine, tryptophane and histidine.

The above described carboxylic acid is preferably 2-ethylhexanoic acid, octylic acid, neodecanoic acid, oleic acid or naphthenic acid because these acids are particularly easily available and low in price, and satisfactorily compatible with the component (A).

When the melting point of the carboxylic acid is high (the crystallinity is high), the metal carboxylate having the acid radical of the carboxylic acid concerned has similarly a high melting point and is hardly handlable (poor in workability). Accordingly, the melting point of the carboxylic acid is preferably 65° C. or less, more preferably −50 to 50° C., and particularly preferably −40 to 35° C.

Additionally, when the number of the carbon atoms in the carboxylic acid is large (the molecular weight thereof is large), the metal carboxylate having the acid radical of the carboxylic acid concerned takes a solid form or a highly viscous liquid form, becoming hardly handlable (degrading the workability thereof). On the contrary, when the number of the carbon atoms in the above described carboxylic acid is small (the molecular weight thereof is small), sometimes the metal carboxylate having the acid radical of the carboxylic acid concerned contains such components that are easily evaporated by heating, and the catalytic activity of the metal carboxylate is degraded. Particularly, under the conditions that the composition is extended thinly (under the conditions of a thin layer), sometimes the evaporation due to heating becomes significant, and the catalytic activity of the metal carboxylate is largely degraded. Accordingly, for the above described carboxylic acid, the number of the carbon atoms inclusive of the carbonyl carbon atom(s) is preferably 2 to 20, more preferably 6 to 17, and particularly preferably 8 to 12.

From the viewpoint of easy handlability (workability and viscosity) of the metal carboxylate, the metal carboxylate is preferably a metal dicarboxylate or a metal monocarboxylate, and more preferably a metal monocarboxylate.

Additionally, the above described metal carboxylate is preferably a metal carboxylate in which the carbon atom adjacent to the carbonyl group is a tertiary carbon atom (tin 2-ethylhexanoate and the like) or a metal carboxylate in which the carbon atom adjacent to the carbonyl group is a quaternary carbon atom (tin neodecanoate, tin pivalate and the like) because of rapid curing rate, and is particularly preferably a metal carboxylate in which the carbon atom adjacent to the carbonyl group is a quaternary carbon atom. The metal carboxylate in which the carbon atom adjacent to the carbonyl group is a quaternary carbon atom leads to a better adhesion as compared to other metal carboxylates.

Examples of the carboxylic acid having the acid radical of the metal carboxylate in which the carbon atom adjacent to the carbonyl group is a quaternary carbon atom may include chain fatty acids represented by the general formula (7):

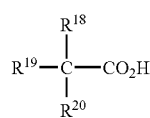

(7)

wherein $R^{18}$, $R^{19}$ and $R^{20}$ are each independently a substituted or unsubstituted monovalent hydrocarbon group, and may include carboxyl groups; and cyclic fatty acids having a structure represented by the general formula (8):

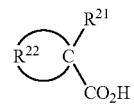

(8)

wherein $R^{21}$ is a substituted or unsubstituted monovalent organic group, $R^{22}$ is a substituted or unsubstituted divalent hydrocarbon group, and $R^{21}$ and $R^{22}$ may include carboxyl groups, and having a structure represented by the general formula (9):

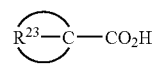

(9)

wherein $R^{23}$ is a substituted or unsubstituted trivalent hydrocarbon group and may include carboxyl groups. Specific examples may include chain monocarboxylic acids such as pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid, 2,2-dimethyl-3-hydroxylpropionic acid; chain dicarboxylic acids such as dimethylmalonic acid, ethylmethylmalonic acid, diethylmalonic acid, 2,2-dimethylsuccinic acid, 2,2-diethylsuccinic acid, 2,2-dimethylglutaric acid; chain tricarboxylic acids such as 3-methylisocitric acid and 4,4-dimethylaconitic acid; and cyclic carboxylic acids such as 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid and bicyclo[2.2.2]octane-1-carboxylic acid. Compounds having such structures are abundant in natural products, and such compounds can certainly be used.

Particularly, metal salts of monocarboxylic acids are more preferable because the metal salts are satisfactory in the compatibility with the component (A) and easy in handling; additionally, metal salts of chain monocarboxylic acids are more preferable. Additionally, because of easy availability, metal salts of pivalic acid, neodecanoic acid, versatic acid, 2,2-dimethyloctanoic acid, 2-ethyl-2,5-dimethylhexanoic acid and the like are particularly preferable.

The number of the carbon atoms in such carboxylic acid having the acid radical of a metal carboxylate in which the carbon atom adjacent to the carbonyl group is a quaternary carbon atom is preferably 5 to 20, more preferably 6 to 17, and particularly preferably 8 to 12. When the number of the carbon atoms exceeds these ranges, the metal carboxylate tends to take a solid form, becomes hardly compatible with the component (A), and tends to hardly exhibit activity. On the other hand, when the number of the carbon atoms is small, the metal carboxylate tends to evaporate and tend to display strong odor. From the viewpoints of these issues, metal salts of neodecanoic acid, versatic acid, 2,2-dimethyloctanoic acid and 2-ethyl-2,5-dimethylhexanoic acid are most preferable.

The use of such metal carboxylates as the component (B1) of the present invention provides cured substances having satisfactory recovery properties, durability and creep resistance. Also provided are cured substances satisfactory in water-resistant adhesion, adhesion durability under conditions of high temperatures and high humidities, residual tack, dust sticking property, staining property, surface weather resistance, heat resistance and adhesion to concrete.

The used amount of the component (B1) is preferably about 0.01 to 20 parts by weight, and further preferably about 0.5 to 10 parts by weight, in relation to 100 parts by weight of the component (A). When the blended content of the component (B1) is less than these ranges, sometimes the curing rate becomes slow, and the curing reaction tends to hardly proceed to a sufficient extent. On the other hand, when the blended content of the component (B1) exceeds these ranges, the work life tends to become too short and the workability tends to be degraded, and the storage stability also tends to be degraded.

The metal carboxylates as the component (B1) may be used each alone, and additionally, may be used in combinations of two or more thereof.

As the component (B2), carboxylic acids can be used. The component (B2) is a non-organotin compound, and is also a nonmetallic compound, and is accordingly preferable from the viewpoint of environmental effects.

The component (B2) can be used alone as a curing catalyst. However, concomitant use of it with the component (B1) provides effects to improve the curing activity of the curing composition of the present invention. Also when a metal carboxylate as the component (B1) is used as a curing catalyst, sometimes the curability is found to be degraded after storage; in this connection, addition of the component (B2) suppresses the curability degradation found after storage.

Examples of the carboxylic acid as the component (B2) may include the above described various carboxylic acids each having the acid radical of a metal carboxylate as the component (B1). Additionally, those carboxylic acid derivatives which can produce the above described carboxylic acids by hydrolysis, namely, the derivatives such as carboxylic acid anhydrides, esters, acyl halides, nitrites and amides can also be used as the component (B2).

The number of the carbon atoms in carboxylic acid as the component (B2) inclusive of the carbonyl carbon atom(s) is preferably 2 to 20, more preferably 6 to 17, and particularly preferably 8 to 12, similarly to the case of the carboxylic acids each having the acid radical of a metal carboxylate as the component (B1). From the viewpoint of easy handlability (workability and viscosity) of the carboxylic acid, the carboxylic acid is preferably a dicarboxylic acid or a monocarboxylic acid, and more preferably a monocarboxylic acid. Additionally, the above described carboxylic acid is preferably carboxylic acid in which the carbon atom adjacent to the carbonyl group is a tertiary carbon atom (2-ethylhexanoic acid and the like) or carboxylic acid in which the carbon atom adjacent to the carbonyl group is a quaternary carbon atom (neodecanoic acid, pivalic acid and the like) because of rapid curing rate, and is particularly preferably carboxylic acid in which the carbon atom adjacent to the carbonyl group is a quaternary carbon atom.

From the viewpoints of the availability, curability and workability, as the carboxylic acid, 2-ethylhexanoic acid, neodecanoic acid, versatic acid, 2,2-dimethyloctanoic acid and 2-ethyl-2,5-dimethylhexanoic acid are particularly preferable.

The use of carboxylic acid as the component (B2) provides curing compositions giving cured substances having satisfactory recovery properties, durability and creep resistance. Also provided are cured substances satisfactory in water-resistant adhesion, adhesion durability under conditions of high temperatures and high humidities, residual tack, dust sticking property, staining property, surface weather resistance, heat resistance, adhesion to concrete and the like.

The used amount of the component (B2) is preferably about 0.01 to 20 parts by weight, and further preferably about 0.5 to 10 parts by weight, in relation to 100 parts by weight of the component (A). When the blended content of the component (B2) is less than these ranges, sometimes the curing rate tends to become slow. On the other hand, when the blended content of the component (B2) exceeds these ranges, the work life tends to become too short and the workability tends to be degraded, and the viscosity also tends to be increased.

The component (B2) may be used alone or in combinations of two or more.

The component (B1) and the component (B2) may be used each alone, or in combination.

In this connection, when only with the component (B), activity is low and hence no appropriate curability is obtained, an amine compound may be added as a component (D).

Specific examples of the amine compound as the component (D) may include, but are not limited to, aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine and cyclohexylamine; aliphatic secondary amines such as dimethylamine, diethylamine, dipropylamine, diisopropylamine, dibutylamine, diamylamine, dihexylamine, dioctylamine, bis (2-ethylhexyl)amine, didecylamine, dilaurylamine, dicetylamine, distearylamine, methylstearylamine, ethylstearylamine and butylstearylamine; aliphatic tertiary amines such as triamylamine, trihexylamine and trioctylamine; unsaturated aliphatic amines such as triallylamine and oleylamine; aromatic amines such as laurylaniline, stearylaniline and triphenylamine; and other amine compounds such as benzylamine, monoethanolamine, diethanolamine, triethanolamine, 3-hydroxypropylamine, ethylenediamine, N,N-diethylethylenediamine, xylylenediamine, diethylenetriamine, triethylenetetramine, 3-methoxypropylamine, 3-lauryloxypropylamine, N-methyl-1,3-propanediamine, 3-dimethylaminopropylamine, 3-diethylaminopropylamine, 3-(1-piperazinyl)propylamine, 3-morpholinopropylamine, 2-(1-piperazinyl)ethylamine, hexamethylenediamine, triethylenediamine, guanidine, diphenylguanidine, 2,4,6-tris (dimethylaminomethyl)phenol, morpholine, N-methylmorpholine, 2-ethyl-4-methylimidazole, 1,8-diazabicyclo(5,4,0) undecene-7 (DBU) and 1,5-diazabicyclo(4,3,0)nonene-5 (DBN).

Because the cocatalytic activity of the component (D) is largely varied depending on the structure of the component (D) itself and the compatibility thereof with the component (A), it is preferable that an appropriate amine compound is selected in conformity with the type of the component (A) to be used. When a polyoxyalkylene polymer, for example, is used as the component (A), primary amines such as octylamine and laurylamine are preferable because these amines are high in cocatalytic activity; additionally, more preferable are the amine compounds each having a hydrocarbon group having at least one hetero atom. Examples of the hetero atom as referred to here may include N, O and S atoms, but the hetero atom is not limited to these examples. Examples of such amine compounds may include the amines described above under the category of other amines. Among such amines, more preferable are the amine compounds each having a hydrocarbon group having a hetero atom on the carbon atom at position 2, 3 or 4. Examples of such amine compounds may include 3-hydroxylpropylamine, 3-methoxypropylamine, 3-ethoxypropylamine, 3-lauryloxypropylamine, N-methyl-1,3-propanediamine, 3-dimethylaminopropylamine, 3-diethylaminopropylamine, 3-(1-piperazinyl)propylamine and 3-morpholinopropylamine. Among these amine compounds, 3-diethylaminopropylamine and 3-morpholinopropylamine are more preferable because these two compounds are high in cocatalytic activity. 3-Diethylaminopropylamine is particularly preferable because this compound gives curing compositions satisfactory in adhesion, storage stability and workability. Additionally, when an isobutylene polymer is used as the component (A), relatively long chain aliphatic secondary amines such as dioctylamine and distearylamine and aliphatic secondary amines such as dicyclohexylamine are preferable because of the high cocatalytic activity of each of these amines.

The blended amount of the amine compound as the component (D) is preferably about 0.01 to 20 parts by weight and more preferably 0.1 to 5 parts by weight in relation to 100 parts by weight of the organic polymer as the component (A). When the blended amount of the amine compound is less than 0.01 part by weight, sometimes the curing rate becomes slow, and the curing reaction hardly proceeds to a sufficient extent. On the other hand, when the blended amount of the amine compound exceeds 20 parts by weight, sometimes the pot life tends to become too short, or sometimes the curing rate reversely becomes slow.

As the component (C) of the present invention, a silicon compound having a hetero atom on an α or β position carbon atom with respect to the silicon atom is used.

As described above, when the component (B) of the present invention is used as curing catalyst, the curability is generally lower than when an organotin compound is used as curing catalyst.

Thus, the use of the component (C) in combination with the component (B) provides a curing composition which is improved in curability. In particular, the combination of carboxylic acid as the component (B2) with the component (C) attains a remarkable effect. The curability improvement effect due to the component (C) is such a specific effect that is ascribable to the combination of the component (C) with the component (B), and cannot be observed when an organotin compound is used as curing catalyst. Additionally, a catalyst system based on the combination of the component (B2) with the component (C) is free from the heavy metals of the fourth period or higher in the periodic table, and is accordingly preferable from the viewpoint of the environmental effects.

The use of the component (C) in combination also attains an adhesion improvement effect.

Among the compounds as the component (C), the silicon compounds represented by the general formula (2) are preferable from the viewpoint of the higher advantageous effects of the present invention:

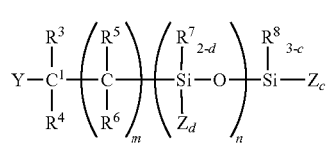

(2)

wherein $R^3$ to $R^6$ are each independently a hydrogen atom, or a substituted or unsubstituted monovalent hydrocarbon group having 1 to 20 carbon atoms; $R^7$ and $R^8$ are each independently an alkyl group having 1 to 20 carbon atoms, an aryl group having 6 to 20 carbon atoms, an aralkyl group having 7 to 20 carbon atoms, or a triorganosiloxy group represented by $(R'')_3SiO$—, $R''$s each being independently a substituted or unsubstituted monovalent hydrocarbon group having 1 to 20 carbon atoms; Y is a substituent bonded to an adjacent carbon atom ($C^1$) through a hetero bond; Zs are each independently a hydroxyl or hydrolyzable group; c represents 0, 1, 2 or 3 and d represents 0, 1 or 2 with the proviso that c and d are not 0 simultaneously; m represents 0 or 1; and n represents 0 or an integer of 1 to 19. No particular constraint is imposed on the hetero substituent represented by Y in the above formula; from the viewpoint of the high improvement effect of the curability, Y is more preferably a nitrogen substituent represented by —$NR^9{}_2$ or —$N=R^{10}$, wherein two $R^9$s are each independently a hydrogen atom, or a substituted or unsubstituted monovalent hydrocarbon group, and $R^{10}$ is a substituted or unsubstituted divalent hydrocarbon group, an oxygen substituent represented by —$OR^{11}$, wherein $R^{11}$ is a hydrogen atom, or a substituted or unsubstituted monovalent hydrocarbon group, or a sulfur substituent represented by —$SR^{12}$, wherein $R^{12}$ is a hydrogen atom, or a substituted or unsubstituted monovalent hydrocarbon group; the nitrogen substituent is particularly preferable, and a group represented by —$NR^9{}_2$ is most preferable wherein $R^9$s are the same as above.

Specific examples of the hetero substituents may include: substituted and unsubstituted amino groups such as —$NH_2$, —$NHCH_3$, —$NHC_2H_5$, —$NHC_3H_7$, —$NHC_4H_9$, —$NHC_6H_{13}$, —$NHC_8H_{17}$, —$NHC_{12}H_{25}$, —$NHC_{18}H_{37}$, —$N(CH_3)_2$, —$N(C_2H_5)_2$, —$N(C_3H_7)_2$, —$N(C_4H_9)_2$, —$N(C_6H_{13})_2$, —$N(C_8H_{17})_2$, —$N(C_{18}H_{37})_2$, —$NHC_2H_4NH_2$, —$NHC_2H_4NHC_2H_4NH_2$, an N-cyclohexylamino group, an N,N-dicyclohexylamino group and an N-phenylamino group; substituted and unsubstituted cyclic amino groups such as a 1-piperidino group, a 4-methyl-1-piperidino group, a 1-pyrrolidino group and a morpholino group; an isocyanato group [—NCO]; an isothiocyanato group [—NCS]; substituted and unsubstituted isocyano groups such as —$N=CH_2$; a hydroxyl group; alkoxy groups such as —$OCH_3$ and —$OC_2H_5$; substituted and unsubstituted carbonyloxy groups such as —$OCOCH_3$, —$OCOCH=CH_2$ and —$OCOC(CH_3)=CH_2$; and substituted and unsubstituted mercapto groups such as —SH, —$SCH_3$ and —$SC_2H_4NH_2$. Among these groups, from the viewpoint of high curability improvement effect, preferable are nitrogen substituents such as substituted and unsubstituted amino groups and cyclic amino groups, an isocyanato group, an isothiocyanato group, and substituted and unsubstituted isocyano groups, and oxygen substituents such as alkoxy groups and carbonyloxy groups; more preferable are substituted and unsubstituted amino groups and cyclic amino groups; and most preferable are substituted amino groups.

Among the silicon compounds represented by the general formula (2), the silicon compounds with m equal to 0 are more preferable from the viewpoints of availability and high curability improvement effects.

Specific examples of the silicon compounds as the component (C) may include: aminomethyltrimethoxysilane, aminomethyltriethoxysilane, N-methylaminomethyltrimethoxysilane, N-methylaminomethyltriethoxysilane, N,N-dimethylaminomethyltrimethoxysilane, N,N-diethylaminomethyltrimethoxysilane, N,N-diethylaminomethyldimethoxymethylsilane, N,N-diethylaminomethyltriethoxysilane, N,N-diethylaminomethyltriisopropoxysilane, N-(2-aminoethyl)aminomethyltrimethoxysilane, N-(2-aminoethyl)aminomethyltriethoxysilane, N-cyclohexylaminomethyltrimethoxysilane, N-cyclohexylaminomethyltriethoxysilane, N-cyclohexylaminomethyldiethoxymethylsilane, N-cyclohexylaminomethylethoxydimethylsilane, N-(1-piperidino)methyltriethoxysilane, N-phenylaminomethyltrimethoxysilane, isocyanatomethyltrimethoxysilane, isocyanatomethyldimethoxymethylsilane, acetoxymethyltrimethoxysilane, acetoxymethyltriethoxysilane, acetoxyethyltriethoxysilane, mercaptomethyltrimethoxysilane, mercaptomethyltriethoxysilane, mercaptomethylethoxydimethylsilane, 2-(1-piperidino)ethyldimethoxymethylsilane, 2-(1-piperidino)ethylmethylbis(trimethylsiloxy)silane, aminoethylthioethyltriethoxysilane, aminoethylthioethyldiethoxymethylsilane, O,O'-diethyl-S-(2-triethoxysilylethyl)dithiophosphate, diethylphosphatoethyltriethoxysilane and diphenylphosphinoethyltriethoxysilane.

The used amount of the component (C) is preferably about 0.01 to 10 parts, and more preferably about 0.5 to 5 parts by weight, in relation to 100 parts by weight of the component (A). When the blended content is less than these ranges, the advantages effects as described above tend to be hardly attained. On the other hand, the blended content exceeds these ranges, sometimes the curing time reversely becomes long and no advantageous effects of the present invention can be attained.

A silicate can also be added to the composition of the present invention. The silicate functions as a cross linking agent, and has functions to improve the recovery properties, durability and creep resistance of the organic polymer as the component (A) of the present invention. It further has effects to improve the adhesion, water resistant adhesion and adhesion durability under conditions of high temperatures and high humidities. As the silicate, tetraalkoxysilanes and alkylalkoxysilanes and partially hydrolyzed condensates thereof can be used.

Specific examples of the silicate may include: tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane; and the partially hydrolyzed condensates thereof.

The partially hydrolyzed condensates of the tetraalkoxysilanes are more preferable because these condensates have larger improvement effects of the recovery properties, durability and creep resistance in the present invention than the tetraalkoxysilanes.

Examples of the partially hydrolyzed condensates of the tetraalkoxysilanes may include products obtained by condensation through partial hydrolysis of the tetraalkoxysilanes by adding water to the tetraalkoxysilanes according to common methods. As partially hydrolyzed condensates of organosilicate compounds, commercially available products can be used. Examples of such condensates may include Methyl Silicate 51 and Ethyl Silicate 40 (manufactured by Colcoat Co., Ltd.).

A filler may be added to the curing composition of the present invention. Examples of the filler may include: reinforcing fillers such as fumed silica, precipitated silica, crystalline silica, fused silica, dolomite, anhydrous silicic acid, hydrous silicic acid and carbon black; fillers such as ground calcium carbonate, precipitated calcium carbonate, magnesium carbonate, diatomite, sintered clay, clay, talc, titanium oxide, bentonite, organic bentonite, ferric oxide, aluminum fine powder, flint powder, zinc oxide, active zinc white, shirasu balloon, glass microballoon, organic microballoons of phenolic resin and vinylidene chloride resin, and resin powders such as PVC powder and PMMA powder; and fibrous fillers such as asbestos, glass fiber and glass filament.

When a filler is used, the used amount thereof is 1 to 250 parts by weight and preferably 10 to 200 parts by weight in relation to 100 parts by weight of the organic polymer as the component (A).

When it is desired to obtain a cured substance high in strength by use of these fillers, preferable is a filler mainly selected from fumed silica, precipitated silica, crystalline silica, fused silica, dolomite, anhydrous silicic acid, hydrous silicic acid, carbon black, surface treated fine calcium carbonate, sintered clay, clay, active zinc white and the like; a desirable effect is obtained when such a filler is used within a range from 1 to 200 parts by weight in relation to 100 parts by weight of the reactive silicon group-containing organic polymer (A). Also, when it is desired to obtain a cured substance low in tensile strength and large in elongation at break, a desirable effect is obtained by use of a filler mainly selected from titanium oxide, calcium carbonate such as ground calcium carbonate, magnesium carbonate, talc, ferric oxide, zinc oxide, shirasu balloon and the like within a range from 5 to 200 parts by weight in relation to 100 parts by weight of the reactive silicon group-containing organic polymer (A). It is to be noted that in general, the calcium carbonate exhibits, with increasing specific surface area value thereof, an increasing improvement effect of the tensile strength at break, elongation at break and adhesion of the cured substance is obtained. Needless to say, these fillers may be used each alone or in admixtures of two or more thereof. When calcium carbonate is used, it is desirable to use surface treated fine calcium carbonate in combination with calcium carbonate larger in particle size such as ground calcium carbonate. The particle size of surface treated fine calcium carbonate is preferably 0.5 μm or less, and the surface treatment is preferably carried out by treating with a fatty acid or a fatty acid salt. The calcium carbonate larger in particle size is preferably 1 μm or more in particle size, and can be used without being subjected to surface treatment.

For the purpose of improving the workability (unstickiness and the like) of the composition and deglossing the surface of the cured substance, organic balloons and inorganic balloons are preferably added. Such fillers can be subjected to surface treatment, and may be used each alone or in admixtures of two or more thereof. For the purpose of improving the workability (unstickiness and the like), the particle sizes of these balloons are preferably 0.1 mm or less. For the purpose of deglossing the surface of the cured substance, the particle sizes are preferably 5 to 300 μm.

On the grounds that the cured substance of the composition of the present invention is satisfactory in weather resistance and the like, the composition of the present invention is suitably used for joints of housing exterior wall such as sizing boards, in particular, ceramic sizing boards, for an adhesive for exterior wall tiles, for an adhesive for exterior wall tiles remaining in the joints and for the like purposes; in this connection, it is desirable that the design of the exterior wall and the design of the sealant are in harmony with each other. Particularly, posh exterior walls have come to be used by virtue of sputter coating and mixing colored aggregates. When the composition of the present invention is blended with a scale-like or granulated material having a diameter of 0.1 mm or more, preferably about 0.1 to 5.0 mm, the cured substance comes to be in harmony with such posh exterior walls, and is excellent in chemical resistance, so that the composition concerned comes to be an excellent composition in the sense that the exterior appearance of the cured substance remains unchanged over a long period of time. Use of a granulated material provides a dispersed sand-like or sandstone-like surface with a rough texture, while use of a scale-like material provides an irregular surface based on the scale-like shape of the material.

The preferable diameter, blended amount and materials for the scale-like or granulated material are described in Japanese Patent Laid-Open No. 9-53063 as follows.

The diameter is 0.1 mm or more, preferably about 0.1 to 5.0 mm, and there is used a material having an appropriate size in conformity with the material quality and pattern of exterior wall. Materials having a diameter about 0.2 mm to 5.0 mm and materials having a diameter about 0.5 mm to 5.0 mm can also be used. In the case of a scale-like material, the thickness is set to be as thin as the order of $1/10$ to $1/5$ the diameter (the order of 0.01 to 1.00 mm). The scale-like or granulated material is transported to the construction site as a sealant in a condition that the material is beforehand mixed in the main component of the sealant, or is mixed in the main component of the sealant at the construction site when the sealant is used.

The scale-like or granulated material is blended in a content about 1 to 200 parts by weight in relation to 100 parts by weight of a composition such as a sealant composition and an adhesive composition. The blended amount is appropriately selected depending on the size of the scale-like or granulated material, and the material quality and pattern of exterior wall.

As the scale-like or granulated material, natural products such as silica sand and mica, synthetic rubbers, synthetic resins and inorganic substances such as alumina are used. The material is colored in an appropriate color so as to match the material quality and pattern of exterior wall for the purpose of heightening the design quality when filled in the joints.

A preferable finishing method and the like are described in Japanese Patent Laid-Open No. 9-53063.

When a balloon (preferably the mean particle size thereof is 0.1 mm or more) is also used for a similar purpose, the surface is formed to have a dispersed sand-like or sandstone-like surface with a rough texture, and a reduction of weight can be achieved. The preferable diameter, blended amount and materials for the balloon are described in Japanese Patent Laid-Open No. 10-251618 as follows.

The balloon is a sphere-shaped filler with a hollow interior. Examples of the material for such a balloon may include inorganic materials such as glass, shirasu and silica; and organic materials such as phenolic resin, urea resin, polystyrene and Saran™; however, the material concerned is not limited to these examples; an inorganic material and an organic material can be compounded, or can be laminated to form multiple layers. An inorganic balloon, an organic balloon, a balloon made of a compounded inorganic-organic material or the like can be used. Additionally, as a balloon to be used, either a single type of balloon or an admixture of multiple types of balloons can be used. Moreover, a balloon with the processed surface thereof or with the coated surface thereof can be used, and additionally, a balloon with the surface thereof subjected to treatment with various surface treatment agents can also be used. More specifically, examples may be cited in which an organic balloon is coated with calcium carbonate, talc, titanium oxide and the like, and an inorganic balloon is subjected to surface treatment with a silane coupling agent.

For the purpose of obtaining a dispersed sand-like or sandstone-like surface with a rough texture, the particle size of the balloon is preferably 0.1 mm or more. A balloon of a particle size about 0.2 mm to 5.0 mm or a balloon of a particle size about 0.5 mm to 5.0 mm can also be used. Use of a balloon of a particle size of less than 0.1 mm sometimes only increases the viscosity of the composition, and yields no rough texture even when the used amount of the balloon is large. The blended amount of the balloon can be easily determined in conformity with the desired degree of the dispersed sand-like or sandstone-like rough texture. Usually, it is desirable that a balloon of 0.1 mm or more in particle size is blended in a ratio of 5 to 25 vol % in terms of the volume concentration in the composition. When the volume concentration of the balloon is less than 5 vol %, no rough texture can be obtained, while when the volume concentration of the balloon exceeds 25 vol %, the viscosity of the sealant and that of the adhesive tend to become high to degrade the workability, and the modulus of the cured substance becomes high, so that the basic performance of the sealant and that of the adhesive tend to be impaired. The preferable volume concentration to balance with the basic performance of the sealant is 8 to 22 vol %.

When a balloon is used, there may be added an antislip agent described in Japanese Patent Laid-Open No. 2000-154368 and an amine compound to make irregular and degloss the surface of the cured substance described in Japanese Patent Laid-Open No. 2001-164237, in particular, a primary amine and/or a secondary amine having a melting point of 35° C. or higher.

Specific examples of the balloon are described in the following publications: Japanese Patent Laid-Open Nos. 2-129262, 4-8788, 4-173867, 5-1225, 7-113073, 9-53063, 10-251618, 2000-154368 and 2001-164237; and WO97/05201.

When the composition of the present invention includes the particles of the cured substance derived from a sealant, the cured substance can make irregularities on the surface to improve the design quality. The preferable diameter, blended amount and materials of the cured substance particle material derived from a sealant is described in Japanese Patent Laid-Open No. 2001-115142 as follows. The diameter is preferably about 0.1 mm to 1 mm, and further preferably about 0.2 to 0.5 mm. The blended amount is preferably 5 to 100 wt %, and further preferably 20 to 50 wt % in the curing composition. Examples of the materials include urethane resin, silicone, modified silicone and polysulfide rubber. No constraint is imposed on the materials as long as the materials can be used as sealants; however, modified silicone sealants are preferable.

A plasticizer may be added to the composition of the present invention. Addition of a plasticizer makes it possible to adjust the viscosity and slump property of the curing composition and the mechanical properties such as tensile strength and elongation of the cured substance obtained by curing the composition. Examples of the plasticizer may include phthalates such as dibutyl phthalate, diheptyl phthalate, bis(2-ethylhexyl) phthalate and butyl benzyl phthalate; nonaroamtic dibasic acid esters such as dioctyl adipate, dioctyl sebacate, dibutyl sebacate and isodecyl succinate; aliphatic esters such as butyl oleate and methyl acetylrecinoleate; phosphates such as tricresyl phosphate and tributyl phosphate; alkyl sulfates; trimellitates; chlorinated paraffins; hydrocarbon oils such as alkyldiphenyls and partially hydrogenated terphenyls; process oils; and epoxy plasticizers such as epoxidized soybean oil and benzyl epoxystearate.

Additionally, a polymer plasticizer may be used. When a polymer plasticizer is used, the initial physical properties are maintained over a longer period of time than when a low molecular weight plasticizer which is a plasticizer containing no polymer component in the molecule thereof is used. Moreover, the drying property (also referred to as painting property) can be improved when an alkyd painting material is applied onto the cured substance concerned. Examples of the polymer plasticizer may include vinyl polymers obtained by polymerizing vinyl monomers by means of various methods;

polyalkylene glycol esters such as diethylene glycol dibenzoate, triethylene glycol dibenzoate and pentaerythritol ester; polyester plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; polyethers including polyether polyols each having a molecular weight of 500 or more, additionally 1000 or more such as polyethylene glycol, polypropylene glycol and polytetramethylene glycol, and the derivatives of these polyether polyols in which the hydroxyl groups in these polyether polyols are substituted with ester groups, ether groups and the like; polystyrenes such as polystyrene and poly-α-methylstyrene; and polybutadiene, polybutene, polyisobutylene, butadiene-acrylonitrile and polychloroprene. However, the polymer plasticizer concerned is not limited to these examples.

Among these polymer plasticizers, those polymer plasticizers which are compatible with the organic polymer as the component (A) are preferable. In this regard, polyethers and vinyl polymers are preferable. Additionally, the use of polyethers as plasticizers improves the surface curability and deep part curability, and causes no curing retardation after storage, and hence polyethers are preferable; among polyethers, polypropylene glycol is more preferable. Additionally, from the viewpoint of the compatibility, weather resistance and heat resistance, vinyl polymers are preferable. Among the vinyl polymers, acrylic polymers and/or methacrylic polymers are preferable, and acrylic polymers such as polyalkylacrylate are further preferable. As the polymerization method to produce acrylic polymers, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuous block polymerization of an alkyl acrylate monomer at a high temperature and under a high pressure, as described in Japanese Patent Laid-Open No. 2001-207157.

The number average molecular weight of the polymer plasticizer is preferably 500 to 15000, more preferably 800 to 10000, further preferably 1000 to 8000, particularly preferably 1000 to 5000, and most preferably 1000 to 3000. When the molecular weight is too low, the plasticizer is removed with time thermally and by rainfall, and hence it is made impossible to maintain the initial physical properties over a long period of time, and the painting property with the alkyd painting material cannot be improved. On the other hand, when the molecular weight is too high, the viscosity becomes high and the workability is degraded. No particular constraint is imposed on the molecular weight distribution of the polymer plasticizer. However, it is preferable that the molecular weight distribution is narrow; the molecular weight distribution is preferably less than 1.80, more preferably 1.70 or less, further preferably 1.60 or less, yet further preferably 1.50 or less, particularly preferably 1.40 or less and most preferably 1.30 or less.

The number average molecular weight of a vinyl polymer is measured with the GPC method, and that of a polyether polymer is measured with the end group analysis method. Additionally, the molecular weight distribution (Mw/Mn) is measured with the GPC method (relative to polystyrene standards).

Additionally, the polymer plasticizer may have no reactive silicon group or may have a reactive silicon group. When the polymer plasticizer has a reactive silicon group, the polymer plasticizer acts as a reactive plasticizer, and can prevent the migration of the plasticizer from the cured substance. When the polymer plasticizer has a reactive silicon group, the average number of the reactive silicon group per molecule is 1 or less, and preferably 0.8 or less. When the reactive silicon group-containing plasticizer, in particular, a reactive silicon group-containing oxyalkylene polymer is used, it is necessary that the number average molecular weight thereof be lower than that of the organic polymer as the component (A).

The plasticizers may be used each alone or in combinations of two or more thereof. Additionally, a low molecular weight plasticizer and a polymer plasticizer may be used in combination. It is to be noted that these plasticizers can also be blended when the polymer is produced.

The used amount of the plasticizer is 5 to 150 parts by weight, preferably 10 to 120 parts by weight, and further preferably 20 to 100 parts by weight, in relation to 100 parts by weight of the organic polymer as the component (A). When the used amount is less than 5 parts by weight, the effect of the plasticizer is not exhibited, while when the used amount exceeds 150 parts by weight, the mechanical strength of the cured substance is insufficient.

Silane coupling agents and the reaction products of the silane coupling agents or compounds other than the silane coupling agents as adhesion-imparting agents may be added to the composition of the present invention. Specific examples of the silane coupling agent may include isocyanate group-containing silanes such as γ-isocyanatepropyltrimethoxysilane, γ-isocyanatepropyltriethoxysilane, γ-isocyanatepropylmethyldiethoxysilane and γ-isocyanatepropylmethyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinylic unsaturated group-containing silanes such as vinyltrimethoxysilane, vinyltriethoxysilane, γ-methacryloyloxypropylmethyldimethoxysilane and γ-acloyloxypropylmethyltriethoxysilane; halogen-containing silanes such as γ-chloropropyltrimethoxysilane; and isocyanurate silanes such as tris(trimethoxysilyl) isocyanurate. The derivatives obtained by modifying these compounds, such as an amino-modified silyl polymer, silylated amino polymer, unsaturated aminosilane complex, phenylamino long chain alkylsilane, aminosilylated silicone, and silylated polyester can also be used as silane coupling agents. The silane coupling agents used in the present invention are usually used in a range from 0.1 to 20 parts by weight, and particularly preferably in a range from 0.5 to 10 parts by weight, in relation to 100 parts of an organic polymer having reactive silicon groups (A).

The effect of a silane coupling agent added to the curable composition of the present invention is such that marked adhesion improvement effects are attained under either non-primer conditions or primer-treatment conditions when the curable composition is applied to various types of adherends, namely, inorganic substrates made of glass, aluminum, stainless steel, zinc, copper and mortar and organic substrates made of polyvinyl chloride, acrylic resin, polyester, polyethylene, polypropylene and polycarbonate. When the curable composition is applied under non-primer conditions, improvement effect of adhesion to various adherends is particularly remarkable. No particular constraint is imposed on the adhesion-imparting agents other than the silane coupling agents, and specific examples of such adhesion-imparting agents other than the silane coupling agents include epoxy resin, phenolic resin, sulfur, alkyl titanates and aromatic polyisocyanates. These adhesion-imparting agents may be used each alone or as mixtures of two or more thereof. Addition of these adhesion-imparting agents permits improving adhesion to adherends.

A physical property modifier may be added, according to need, to the curable composition of the present invention for the purpose of regulating the tensile properties of the cured substance to be generated. Without imposing any particular constraint on the physical property modifier, examples of the physical property modifier may include: alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. The use of the physical property modifier makes it possible to increase the hardness or inversely to decrease the hardness to promote the breaking elongation when the composition of the present invention is cured. These physical property modifiers may be used each alone or in combinations of two or more thereof.

It is to be noted that a compound to hydrolytically produce a compound having a monovalent silanol group in the molecule thereof has an effect to decrease the modulus of the cured substance without degrading the stickiness of the surface of the cured substance. Particularly, a compound to produce trimethylsilanol is preferable. Examples of the compound to hydrolytically produce a compound having a monovalent silanol group in the molecule thereof may include a compound described in Japanese Patent Laid-Open No. 5-117521. Additionally, examples of such a compound may include a compound which is a derivative of an alkyl alcohol such as hexanol, octanol or decanol, and produces a silicon compound to hydrolytically produce $R_3SiOH$ such as trimethylsilanol, and a compound described in Japanese Patent Laid-Open No. 11-241029 which is a derivative of a polyhydric alcohol having three or more hydroxyl groups such as trimethylolpropane, glycerin, pentaerythritol or sorbitol, and produces a silicon compound to hydrolytically produce $R_3SiOH$ such as trimethylsilanol.

Additionally, there may be cited such a compound as described in Japanese Patent Laid-Open No. 7-258534 which is a derivative of an oxypropylene polymer and produces a silicon compound to hydrolytically produce $R_3SiOH$ such as trimethylsilanol. Moreover, there may be used a polymer described in Japanese Patent Laid-Open No. 6-279693 which contains a hydrolyzable silicon-containing group capable of cross linking and a silicon-containing group capable of hydrolytically forming a monosilanol-containing compound.

The physical property modifier is used within a range from 0.1 to 20 parts by weight, and preferably from 0.5 to 10 parts by weight, in relation to 100 parts by weight of the reactive silicon group-containing organic polymer (A).

A thixotropic agent (antisagging agent) may be added to the curable composition of the present invention according to need for the purpose of preventing sagging and improving workability. No particular constraint is imposed on the antisagging agents. However, examples of the antisagging agents may include polyamide waxes; hydrogenated castor oil derivatives; and metal soaps such as calcium stearate, aluminum stearate and barium stearate. These thixotropic agents (antisagging agents) may be used each alone or in combinations of two or more thereof. The thixotropic agent is used within a range from 0.1 to 20 parts by weight in relation to 100 parts by weight of the reactive silicon group-containing organic polymer (A).

In the composition of the present invention, a compound which contains an epoxy group in one molecule may be used. Use of an epoxy group-containing compound can enhance the recovery properties of the cured substance. Examples of the epoxy group-containing compound may include compounds such as epoxidized unsaturated oils and fats, epoxidized unsaturated fatty acid esters, alicyclic epoxy compounds and epichlorohydrin derivatives, and admixtures of these compounds. Specific examples may include epoxidized soybean oil, epoxidized flaxseed oil, bis(2-ethylhexyl)-4,5-epoxycyclohexane-1,2-dicarboxylate (E-PS), epoxyoctyl stearate and epoxybutyl stearate. Among these, E-PS is particularly preferable. It is recommended that these epoxy group-containing compounds are each used within a range from 0.5 to 50 parts by weight in relation to 100 parts by weight of the reactive silicon group-containing organic polymer (A).

In the composition of the present invention, a photocurable substance may be used. Use of a photocurable substance forms a coating film of the photocurable substance on the surface of the cured substance to improve the stickiness and the weather resistance of the cured substance. A photocurable substance means a substance which undergoes a chemical change, caused by action of light, of the molecular structure thereof in a fairly short time to result in changes of the physical properties such as curing. Among such a large number of compounds known are organic monomers, oligomers, resins and compositions containing these substances, and any commercially available substances concerned may optionally be adopted. As representative photocurable substances, unsaturated acrylic compounds, polyvinyl cinnamates and azidized resins and the like may be used. The unsaturated acrylic compounds are monomers, oligomers and admixtures of the monomers and the oligomers, the monomers and oligomers each having one or a few acrylic or methacrylic unsaturated groups; examples of the unsaturated acrylic compounds may include monomers such as propylene (or butylene, or ethylene) glycol di(meth)acrylate and neopentylglycol di(meth) dimethacrylate, and oligoesters of 10,000 or less in molecular weight related to these monomers. Specific examples may include special acrylates (bifunctional) such as Aronix M-210, Aronix M-215, Aronix M-220, Aronix M-233, Aronix M-240 and Aronix M-245; special acrylates (trifunctional) such as Aronix M-305, Aronix M-309, Aronix M-310, Aronix M-315, Aronix M-320 and Aronix M-325; and special acrylates (multifunctional) such as Aronix M-400. Those compounds which each have acrylic functional groups are particularly preferable, and additionally, those compounds which each have, on average, three or more acrylic functional groups in one molecule are preferable (all the aforementioned Aronix compounds are the products of Toagosei Co., Ltd.).

Examples of the polyvinyl cinnamates may include photosensitive resins having cinnamoyl groups as photosensitive groups, namely, those compounds obtained by esterification of polyvinyl alcohol with cinnamic acid; and additionally, a large number of derivatives of polyvinyl cinnamates. Azidized resins are known as photosensitive resins having azide groups as photosensitive groups; common examples of the azidized resins may include a rubber photosensitive solution added with an azide compound as photosensitive agent, and additionally, those compounds detailed in "Photosensitive Resins (Kankosei Jushi)" (published by Insatu Gakkai Shuppanbu, Mar. 17, 1972, p. 93, p. 106 and p. 117); and these compounds may be used each alone or in admixtures thereof, and in combination with sensitizers to be added according to need. It is to be noted that addition of sensitizers such as ketones and nitro compounds and accelerators such as amines sometimes enhances the effect. It is recommended that the photocurable substance is used within a range from 0.1 to 20 parts by weight and preferably from 0.5 to 10 parts by weight in relation to 100 parts by weight of the reactive silicon group-containing organic polymer (A); when the content of the photocurable substance is less than 0.1 part by weight, no effect to increase the weather resistance is displayed, while when the content exceeds 20 parts by weight, the cured substance tends to be too hard and cracked.

In the composition of the present invention, an oxygen-curable substance may be used. Examples of the oxygen-curable substance may include unsaturated compounds reactable with the oxygen in the air, which react with the oxygen in the air and form a cured coating film in the vicinity of the surface of the cured substance to act to prevent the surface stickiness and the sticking of dust and grime to the surface of the cured substance and to do the like. Specific examples of the oxygen-curable substance may include drying oils represented by wood oil, flaxseed oil and the like and various alkyd resins obtained by modifying these compounds; acrylic polymers, epoxy resins and silicon resins all modified with drying oils; liquid polymers such as 1,2-polybutadiene and 1,4-polybutadiene obtained by homopolymerizing or copolymerizing diene compounds such as butadiene, chloroprene, isoprene, 1,3-pentadiene, and homopolymers and copolymers of dienes having 5 to 8 carbon atoms, liquid copolymers such as NBR, SBR and the like obtained by copolymerizing these diene compounds with monomers such as acrylonitrile, styrene and the like having copolymerizability with these diene compounds so as for the diene compounds to dominate, and various modified substance of these compounds (maleic modified substances, modified boiled oils and the like). These substances may be used each alone or in combinations of two or more thereof. Among these substances, wood oil and liquid diene polymers are particularly preferable. Additionally, in some cases, when catalysts to accelerate the oxidation curing reaction and metal dryers are used in combination with these substances, the effect is enhanced. Examples of these catalysts and metal dryers may include metal salts such as cobalt naphthenate, lead naphthenate, zirconium naphthenate, cobalt octylate and zirconium octylate; and amine compounds. The used amount of the oxygen-curable substance is recommended such that the oxygen-curable substance is used within a range from 0.1 to 20 parts by weight and further preferably from 0.5 to 10 parts by weight in relation to 100 parts by weight of the reactive silicon group-containing organic polymer (A); when the used amount is less than 0.1 part by weight, improvement of staining property becomes insufficient, while when the used amount exceeds 20 parts by weight, the tensile properties and the like of the cured substance tend to be impaired. It is recommended that the oxygen-curable substance is used in combination with a photocurable substance as described in Japanese Patent Laid-Open No. 3-160053.

In the composition of the present invention, an antioxidant (antiaging agent) may be used. Use of an antioxidant may increase the heat resistance of the cured substance. Examples of the antioxidant may include hindered phenol antioxidants, monophenol antioxidants, bisphenol antioxidants and polyphenol antioxidants, hindered phenol antioxidants being particularly preferable. Similarly, the following hindered amine photostabilizers may also be used: Tinuvin 622LD, Tinuvin 144; CHIMASSORB 944LD and CHIMASSORB 119FL (all manufactured by Ciba-Geigy Japan Ltd.); MARK LA-57, MARK LA-62, MARK LA-67, MARK LA-63 and MARK LA-68 (all manufactured by Adeka Argus Chemical Co., Ltd.); and Sanol LS-770, Sanol LS-765, Sanol LS-292, Sanol LS-2626, Sanol LS-1114 and Sanol LS-744 (all manufactured by Sankyo Co., Ltd.). Specific examples of the antioxidants are described also in Japanese Patent Laid-Open Nos. 4-283259 and 9-194731. The used amount of the antioxidant is recommended such that the antioxidant is used within a range from 0.1 to 10 parts by weight and further preferably from 0.2 to 5 parts by weight in relation to 100 parts by weight of the reactive silicon group-containing organic polymer (A).

In the composition of the present invention, a photostabilizer may be used. Use of a photostabilizer can prevent the photooxidation degradation of the cured substance. Examples of the photostabilizer may include benzotriazole compounds, hindered amine compounds and benzoate compounds; hindered amine compounds are particularly preferable. The used amount of the photostabilizer is recommended such that the photostabilizer is used within a range from 0.1 to 10 parts by weight and further preferably from 0.2 to 5 parts by weight in relation to 100 parts by weight of the reactive silicon group-containing organic polymer (A). Specific examples of the photostabilizer are also described in Japanese Patent Laid-Open No. 9-194731.

When the photocurable substance is used in the composition of the present invention, in particular, when an unsaturated acrylic compound is used, it is preferable to use a tertiary amine-containing hindered amine photostabilizer as a hindered amine photostabilizer as described in Japanese Patent Laid-Open No. 5-70531 for the purpose of improving the storage stability of the composition. Examples of the tertiary amine-containing hindered amine photostabilizer may include Tinuvin 622LD, Tinuvin 144 and CHIMASSORB 119FL (all manufactured by Ciba-Geigy Japan Ltd.); MARK LA-57, LA-62, LA-67 and LA-63 (all manufactured by Adeka Argus Chemical Co., Ltd.); and Sanol LS-765, LS-292, LS-2626, LS-1114 and LS-744 (all manufactured by Sankyo Co., Ltd.).

In the composition of the present invention, an ultraviolet absorber may be used. Use of an ultraviolet absorber can increase the surface weather resistance of the cured substance. Examples of the ultraviolet absorber may include benzophenone compounds, benzotriazole compounds, salicylate compounds, substituted tolyl compounds and metal chelate compounds; benzotriazole compounds are particularly preferable. The used amount of the ultraviolet absorber is such that the ultraviolet absorber is used in a range from 0.1 to 10 parts by weight, and further preferably from 0.2 to 5 parts by weight in relation to 100 parts by weight of the reactive silicon group-containing organic polymer (A). It is preferable that a phenol or hindered phenol antioxidant, a hindered amine photostabilizer and a benzotriazole ultraviolet absorber are used in combination.

To the composition of the present invention, an epoxy resin may be added. The composition added with an epoxy resin is particularly preferable as an adhesive, in particular, an adhesive for exterior wall tile. Examples of the epoxy resin may include epichlorohydrin-bisphenol A-type epoxy resins, epichlorohydrin-bisphenol F-type epoxy resins and flame retardant epoxy resins such as glycidyl ether of tetrabromobisphenol A; novolac-type epoxy resins; hydrogenated bisphenol A-type epoxy resins; epoxy resins of the type of glycidyl ether of bisphenol A propyleneoxide adduct; p-oxybenzoic acid glycidyl ether ester-type epoxy resins; m-aminophenol epoxy resins; diaminodiphenylmethane epoxy resins; urethane-modified epoxy resins; various alicyclic epoxy resins; N,N-diglycidylaniline, N,N-diglycidyl-o-toluidine, triglycidyl isocyanurate, polyalkylene glycol diglycidyl ether and glycidyl ethers of polyhydric alcohols such as glycerin; hydantoin-type epoxy resins; and epoxidized substances of unsaturated polymers such as petroleum resins. However, the epoxy resin is not limited to these examples, and commonly used epoxy resins may be used. Epoxy resins having at least two epoxy groups in one molecule are preferable because such compositions are high in reactivity when curing is made, and the cured substances can easily form three dimensional networks. Examples of further preferable epoxy resins may include bisphenol A-type epoxy resins or novolac-type epoxy resins. The ratio of the used amount of each of these epoxy resins to the used amount of the reactive silicon group-containing organic polymer (A) falls, in terms of weight ratio, in the range such that (A)/epoxy resin=100/1 to 1/100. When the ratio of (A)/epoxy resin is less than 1/100, the effect of improving the impact strength and the toughness of the cured substance of the epoxy resin becomes hardly obtainable, while when the ratio of (A)/epoxy resin exceeds 100/1, the strength of the cured substance of the polymer becomes insufficient. The preferable ratio of the used amounts is varied depending on the application of the curable resin composition and hence cannot be unconditionally determined; for example, when the impact resistance, flexibility, toughness, and peel strength and the like of the cured substance of the epoxy resin are to be improved, it is recommended that 1 to 100 parts by weight of the component (A), further preferably 5 to 100 parts by weight of the component (A) is used in relation to 100 parts by weight of the epoxy resin. On the other hand, when the strength of the cured substance of the component (A) is to be improved, it is recommended that 1 to 200 parts by weight of the epoxy resin, further preferably 5 to 100 parts by weight of the epoxy resin is used in relation to 100 parts of the component (A).

When the epoxy resin is added, as a matter of course, a curing agent to cure the epoxy resin can be applied together to the composition of the present invention. No particular constraint is imposed on the usable epoxy resin curing agent, and commonly used epoxy resin curing agents may be used. Specific examples of the epoxy resin curing agent may include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyethers; tertiary amines such as 2,4,6-tris(dimethylaminomethyl)phenol and tripropylamine, and salts of the tertiary amines; polyamide resins; imidazoles; dicyandiamides; borontrifluoride complexes; carboxylic acid anhydrides such as phthalic anhydride, hexahydrophthalic anhydride, tetrahydrophthalic anhydride, dodecynylsuccinic anhydride, pyromellitic anhydride and chlorendic anhydride; alcohols; phenols; carboxylic acids; and diketone complexes of aluminum and zirconium. However, the epoxy resin curing agent is not limited to these examples. Additionally, the curing agents may be used each alone or in combinations of two or more thereof.

When an epoxy resin curing agent is used, the used amount thereof falls within a range from 0.1 to 300 parts by weight in relation to 100 parts by weight of the epoxy resin.

As an epoxy resin curing agent, a ketimine may be used. A ketimine is stable when no moisture is present, but moisture decomposes the ketimine into a primary amine and a ketone; the thus produced primary amine acts as a room temperature curable curing agent to cure the epoxy resin. Use of a ketimine makes it possible to obtain a one-part composition. Such a ketimine can be obtained by condensation reaction between an amine compound and a carbonyl compound.

For the synthesis of a ketimine, an amine compound and a carbonyl compound well known in the art can be used. For example, the following compounds may be used as such an amine compound: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyvalent amines such as 1,2,3-triaminopropane, triaminobenzene, tris(2-aminoethyl)amine and tetra(aminomethyl)methane; polyalkylenepolyamines such as diethylenetriamine, triethylenetriamine and tetraethylenepentamine; polyoxyalkylene polyamines; and aminosilanes such as γ-aminopropyltriethoxysilane, N-(β-aminoethyl)-γ- aminopropyltrimethoxysilane and N-(β-aminoethyl)-γ-aminopropylmethyldimethoxysilane. Additionally, the following compounds may be used as such a carbonyl compound: aldehydes such as acetoaldehyde, propionaldehyde, n-butylaldehyde, isobutylaldehyde, diethylacetoaldehyde, glyoxal and benzaldehyde; cyclic ketones such as cyclopentanone, trimethylcyclopentanone, cyclohexanone and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone; and β-dicarbonyl compounds such as acetylacetone, methyl acetoacetate, ethyl acetoacetate, dimethyl malonate, diethyl malonate, methyl ethyl malonate and dibenzoylmethane.

When an imino group is present in the ketimine, the imino group can be reacted with styrene oxide; glycidyl ethers such as butyl glycidyl ether and allyl glycidyl ether; and glycidyl esters. These ketimines may be used each alone or in combinations of two or more thereof; these ketimines are each used within a range from 1 to 100 parts by weight in relation to 100 parts by weight of the epoxy resin, and the used amount of each of the ketimines is varied depending on the type of the epoxy resin and the type of the ketimine.

In the present invention, curing catalysts other than the component (B) may be used as long as the curing catalysts attain the advantageous effects of the present invention.

Examples of the curing catalysts other than the component (B) may include organotin compounds, alkoxy metal compounds, metal chelates, organic sulfonic acids (salts), acid phosphates and inorganic acids.

No particular constraint is imposed on the organotin compounds, and various organotin compounds may be used. Specific examples of such organotin compounds may include:

dialkyltin carboxylates; dialkyltin oxides; and compounds represented by the general formula (10):

$$R^{24}{}_f Sn(OQ)_{4-f} \text{ or } [R^{24}{}_2 Sn(OQ)]_2 O \quad (10)$$

wherein $R^{24}$ represents a monovalent hydrocarbon group having 1 to 20 carbon atoms; Q represents a monovalent hydrocarbon group having 1 to 20 carbon atoms or an organic group having a functional group within itself capable of forming coordinate bonds with Sn; and f represents 1, 2 or 3. Reaction products of tetravalent tin compounds such as dialkyltin oxides and dialkyltin diacetates with low-molecular-weight, hydrolyzable silicon group-containing silicon compounds such as tetraethoxysilane, methyltriethoxysilane, diphenyldimethoxysilane and phenyltrimethoxysilane may also be used. Among these, those compounds represented by the general formula (10), namely, chelate compounds such as dibutyltin bisacetylacetonate and tin alcoholates are more preferable because these compounds are high in catalytic activity.

Specific examples of the dialkyltin carboxylate include dibutyltin dilaurate, dibutyltin diacetate, dibutyltin bis(2-ethylhexanoate), dibutyltin dioctate, dibutyltin bis(methylmaleate), dibutyltin bis(ethylmaleate), dibutyltin bis(butylmaleate), dibutyltin bis(isooctylmaleate), dibutyltin bis(tridecylmaleate), dibutyltin bis(benzylmaleate), dibutyltin maleate, dioctyltin diacetate, dioctyltin distearate, dioctyltin dilaurate, dioctyltin bis(ethylmaleate) and dioctyltin bis(isooctylmaleate). Additionally, alkylstannoxane carboxylates such as 1,1,3,3-tetrabutyl-1,3-dilauroyloxydistannoxane may also be used.

Specific examples of the dialkyltin oxides may include dibutyltin oxide, dioctyltin oxide and reaction products of dibutyltin oxide with various ester compounds (dioctyl phthalate, dimethyl maleate and the like).

Specific examples of the chelate compounds may include the following compounds, but the chelate compounds concerned are not limited to these examples:

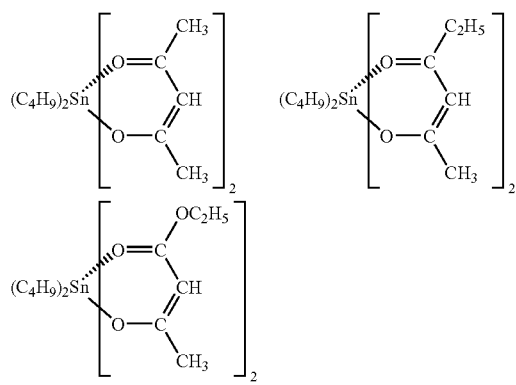

Among these, dibutyltin bisacetylacetonate is most preferable because it is high in catalytic activity, low in cost and easily available.

Specific examples of the tin alcoholates may include the following compounds, but the tin alcoholates concerned are not limited to these examples:

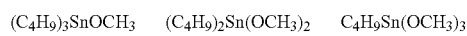

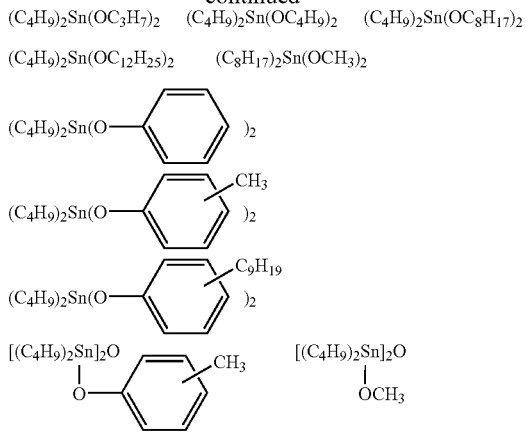

Among these, dialkyltin dialkoxides are preferable. In particular, dibutyltin dimethoxide is more preferable because it is low in cost and easily available.

Concomitant use of an organotin compound provides an effect to remarkably improve the curability in the thin layer portions.

Specific examples of the alkoxy metal compounds and the metal chelates may include: titanium alkoxides such as tetrabutyl titanate, tetraisopropyl titanate, tetramethyl titanate, tetrakis(2-ethylhexyl) titanate and triethanolamine titanate; titanium chelates such as titanium tetrakis(acetylacetonate), titanium tetrakis(ethylacetoacetonate), titanium lactate, bis(acetylacetonato)diisopropoxy titanium; aluminum alkoxides such as triisopropoxy aluminum, isobutoxydiisopropoxy aluminum and triisobutoxy aluminum; aluminum chelates such as aluminum tris(acetylacetonate), aluminum tris(ethylacetoacetate) and diisopropoxy aluminum (ethylacetoacetate); zirconium alkoxides such as tetraisopropoxy zirconium, tetra-n-propoxy zirconium and tetra-n-butoxy zirconium; zirconium chelates such as zirconium tetrakis(acetylacetonate), dibutoxy zirconium bis(acetylacetonate) and butoxy zirconium (acetylacetonate) bis(ethylacetoacetate); and other various metal alkoxides such as tetramethoxy tin and tetrabutoxy hafnium. However, the alkoxy metal compounds and the metal chelates are not limited to these examples.

Examples of the organic sulfonic acid may include methanesulfonic acid, toluenesulfonic acid, styrenesulfonic acid and trifluoromethanesulfonic acid; and salts of these sulfonic acids may also be used.

The acid phosphate means a phosphoric acid ester which contains the moiety represented by —O—P(=O)OH, and may include the acid phosphates shown below. Organic acid phosphates are preferable from the viewpoints of compatibility and curing catalyst activity.

An organic acid phosphate compound is represented by $(R^{25}-O)_g-P(=O)(-OH)_{3-g}$ wherein g represents 1 or 2, and $R^{25}$ represents an organic residue.

Examples include $(CH_3O)_2-P(=O)(-OH)$, $(CH_3O)-P(=O)(-OH)_2$, $(C_2H_5O)_2-P(=O)(-OH)$, $(C_2H_5O)-P(=O)(-OH)_2$, $(C_3H_7O)_2-P(=O)(-OH)$, $(C_3H_7O)-P(=O)(-OH)_2$, $(C_4H_9O)_2-P(=O)(-OH)$, $(C_4H_9O)-P(=O)(-OH)_2$, $(C_8H_{17}O)_2-P(=O)(-OH)$, $(C_8H_{17}O)-P(=O)(-OH)_2$, $(C_{10}H_{21}O)_2-P(=O)(-OH)$, $(C_{10}H_{21}O)-P(=O)(-OH)_2$, $(C_{13}H_{27}O)_2-P(=O)(-OH)$, $(C_{13}H_{27}O)-P(=O)(-OH)_2$, $(C_{16}H_{33}O)_2-P(=O)(—

OH), $(C_{16}H_{33}O)$—P(=O)(—OH)$_2$, (HO—$C_6H_{12}O)_2$—P(=O)(—OH), (HO—$C_6H_{12}O)$—P(=O)(—OH)$_2$, (HO—$C_8R_{16}O)$—P(=O)(—OH), (HO—$C_8H_{16}O)$—P(=O)(—OH)$_2$, {(CH$_2$OH)(CHOH)O}$_2$—P(=O)(—OH), {(CH$_2$OH)(CHOH)O}—P(=O)(—OH)$_2$, {(CH$_2$OH)(CHOH)C$_2$H$_4$O}$_2$—P(=O)(—OH) and {(CH$_2$OH)(CHOH)C$_2$H$_4$O}—P(=O)(—OH)$_2$, but the organic acidic phosphate compounds are not limited to these examples shown above.

Examples of the inorganic acids may include hydrochloric acid, sulfuric acid, phosphoric acid and boronic acid.

To the curing composition of the present invention, various additives may be added according to need for the purpose of adjusting the physical properties of the curing composition or the cured substance. Examples of such additives may include a flame retardant, a curability adjuster, a radical inhibitor, a metal deactivator, an antiozonant, a phosphorus based peroxide decomposer, a lubricant, a pigment, a foaming agent, a solvent and a mildewproofing agent. These various additives may be used each alone or in combinations of two or more thereof. Specific additive examples other than the specific examples cited in the present specification are described, for example, in Japanese Patent Publication Nos. 4-69659 and 7-108928, Japanese Patent Laid-Open Nos. 63-254149, 64-22904, 2001-72854 and the like.

The curing composition of the present invention can also be prepared as a one-part composition in which all the ingredients are blended and hermetically stored in advance and the curing of the composition is carried out by the action of the moisture in the air after application of the composition. The curing composition of the present invention can also be prepared as two-part composition in which the ingredients such as a curing catalyst, a filler, a plasticizer, water and the like are blended in advance separately as a curing component, and the curing component composed of the blended ingredients and an organic polymer composition component are mixed together immediately before application. The one-part composition is preferable from the viewpoint of workability.

When the above described curing composition is of the one-part type, all the ingredients are blended together beforehand, so that it is preferable that the moisture-containing ingredients are used after dehydrating and drying, or the ingredients are dehydrated by reducing pressure or the like while being kneaded for blending. When the above described curing composition is of the two-part type, it is not necessary to blend a curing catalyst with the main part containing a reactive silicon group-containing organic polymer, and hence there is little fear of gelation even when some moisture is contained in the blended ingredients; however, when a long term storage stability is required, it is preferable to carry out dehydration and drying. As for the methods of dehydration and drying, a thermal drying method is suitable for a powdery solid substance or the like, while a reduced pressure dehydration method or a dehydration method which uses a synthetic zeolite, active alumina, silica gel or the like is suitable for a liquid substance. Additionally, there can be adopted a method in which a small amount of isocyanate compound is blended and the isocyanate group thereof is made to react with water to dehydrate. In addition to these dehydration and drying methods, addition of the following compounds further improves the storage stability: lower alcohols such as methanol and ethanol; and alkoxysilane compounds such as n-propyltrimethoxysilane, vinyltrimethoxysilane, vinylmethyldimethoxysilane, γmercaptopropylmethyldimethoxysilane, γ-mercaptopropylmethyldiethoxysilane and γ-glycidoxypropyltrimethoxysilane.

It is preferable that the used amount of a dehydrating agent, in particular, a silicon compound capable of reacting with water such as vinyltrimethoxysilane falls within a range from 0.1 to 20 parts by weight, and preferably 0.5 to 10 parts by weight, in relation to 100 parts by weight of the reactive silicon group-containing organic polymer (A).

No particular constraint is imposed on the preparation method of the curing composition of the present invention; for example, there can be adopted a common method in which the above described ingredients are blended together and kneaded with a mixer, a roll or a kneader at room temperature or under heating, or a common method in which the above described ingredients are dissolved and mixed by use of a small amount of an appropriate solvent.

The curing composition of the present invention forms three dimensional networks when exposed to the air due to the action of the moisture to be cured into a solid matter having a rubber-like elasticity.

EXAMPLES

Next, specific description will be made on the present invention with reference to experimental examples (Examples are the experimental examples 1, 3, 4, 7, 8, 9, 12, 16 and 17; Comparative Examples are the experimental examples 2, 5, 6, 10, 11, 13, 14, 15 and 18); however, the present invention is not limited to these experimental examples.

Synthesis Example 1

By use of a 1:1 (by weight) mixture composed of a polyoxypropylene diol having a molecular weight of about 2,000 and a polyoxypropylene triol having a molecular weight of about 3,000 as an initiator and zinc hexacyanocobaltate-glyme complex as a catalyst, polymerization of propylene oxide was carried out to yield a polypropylene oxide having a number average molecular weight of about 19,000 (a molecular weight relative to polystyrene standards measured by using a HLC-8120 GPC manufactured by Tosoh Corp. as a liquid delivery system, a column of TSK-GEL H-type manufactured by Tosoh Corp., and THF as a solvent). Then, a methanol solution of NaOMe was added in an amount of 1.2 equivalents in relation to the hydroxyl group of the above hydroxyl group-terminated polypropylene oxide, the methanol was distilled off, and allyl chloride was further added to thereby convert the terminal hydroxyl group into an allyl group. Thus, an allyl group-terminated polypropylene oxide having a number average molecular weight of about 19,000 was obtained.

To 100 parts by weight of the thus obtained, crude allyl group-terminated polypropylene oxide, 300 parts by weight of n-hexane and 300 parts by weight of water were added. The mixture thus obtained was stirred to mix, and then the water was removed by centrifugal separation. To the hexane solution thus obtained, 300 parts by weight of water was further added, the mixture thus obtained was stirred to mix, the water was again removed by centrifugal separation, and then the hexane was removed by volatilization under reduced pressure, to yield a purified allyl group-terminated polypropylene oxide (hereinafter referred to as allyl polymer). Then, 100 parts by weight of the obtained ally polymer was reacted with 1.35 parts by weight of methyldimethoxysilane at 90° C. for 5 hours in the presence of 150 ppm of an isopropanol solution of platinum-vinylsiloxane complex having a platinum content of 3 wt % as catalyst, to yield a methyldimethoxysilyl group-terminated polypropylene oxide (A-1).

Experimental Examples 1 to 15

In each of Experimental Examples 1 to 15, the reactive silicon group-containing polyoxyalkylene polymer (A-1) obtained in Synthesis Example 1 was used as the component (A); a filler, a plasticizer, a thixotropic agent, an ultraviolet absorber and a photostabilizer were weighed out respectively according to the prescriptions given in Table 1; and the all these ingredients were fully kneaded with a three-roll paint mill to yield the main part.

Then, in each of Experimental Examples 1 to 15, an organotin compound, the component (B), the component (C) and the component (D) were respectively weighed out as shown in Table 1, and these ingredients were mixed with the above described main part by stirring with a spatula for 3 minutes.

(Curability Test)

After mixing, the compositions thus obtained each were defoamed while being extended thinly with a spatula, filled in a molding frame of about 5 mm in thickness; the surface of each of the compositions was planarized, and the planarization completion time was set as the curing starting time. Every 1 minute, the surface of each of the compositions was touched with a spatula, and the skin formation time (SFT) was taken for evaluation as the time when the composition no longer stuck to the spatula. The results thus obtained are shown in Table 1.

TABLE 1

| Composition (parts by weight) | | | Experimental examples | | | | | | | |
|---|---|---|---|---|---|---|---|---|---|---|
| | | | 1 | 2 | 3 | 4 | 5 | 6 | 7 | 8 |
| Component (A) | | A-1 | 100 | 100 | 100 | 100 | 100 | 100 | 100 | 100 |
| Filler | Hakuenka CCR[1] | Shiraishi Kogyo Kaisha, Ltd. | 120 | 120 | 120 | 120 | 120 | 120 | 120 | 120 |
| Titanium oxide | Tipaque R-820 | Ishihara Sangyo Kaisha, Ltd. | 20 | 20 | 20 | 20 | 20 | 20 | 20 | 20 |
| Plasticizer | DIDP[2] | Kyowa Hakko Kogyo Co., Ltd. | 55 | 55 | 55 | 55 | 55 | 55 | 55 | 55 |
| Antisagging agent | Disparlon #6500[3] | Kusumoto Chemicals, Ltd. | 2 | 2 | 2 | 2 | 2 | 2 | 2 | 2 |
| Ultraviolet absorber | Tinuvin 327[4] | Ciba-Geigy Ltd. | 1 | 1 | 1 | 1 | 1 | 1 | 1 | 1 |
| Photostabilizer | Sanol LS-770[5] | Sankyo Co., Ltd. | 1 | 1 | 1 | 1 | 1 | 1 | 1 | 1 |
| Organotin Compound | Neostann U-220[6] | Nitto Kasei Co., Ltd. | | | | | | | | |
| Component (B1) | Neostann U-50[7] | Nitto Kasei Co., Ltd. | 3.5 | 3.5 | | | | | | |
| Component (B2) | Versatic 10[8] | Japan Epoxy Resin Co., Ltd. | | | 2.58 | 2.58 | 2.58 | 2.58 | 2.58 | 2.58 |
| | 2-Ethylhexanoic acid | Wako Pure Chem. Ind., Ltd. | | | | | | | | |
| Component (C) | Diethylaminomethyltriethoxysilane[9] | AZmax Co., Ltd. | 1.25 | | 1.25 | | | | 1.25 | |
| | LS1455[10] | Shin-Etsu Chem. Co., Ltd. | | | | 0.97 | | | | 0.97 |
| | Acetoxymethyl triethoxysilane[11] | AZmax Co., Ltd. | | | | | | | | |
| | A1120[12] | Japan Unicar Co., Ltd. | | | | | | 1.11 | | |
| Component (D) | n-Octylamine | Wako Pure Chem. Ind., Ltd. | 0.65 | 0.65 | 0.65 | 0.65 | 0.65 | 0.65 | | |
| | DEAPA[13] | Koei Chem. Co., Ltd. | | | | | | | 0.65 | 0.65 |
| Curability | SFT | (min) | 52 | 89 | 27 | 40 | 114 | 114 | 8 | 38 |

| Composition (parts by weight) | | | Experimental examples | | | | | | |
|---|---|---|---|---|---|---|---|---|---|
| | | | 9 | 10 | 11 | 12 | 13 | 14 | 15 |
| Component (A) | | A-1 | 100 | 100 | 100 | 100 | 100 | 100 | 100 |
| Filler | Hakuenka CCR[1] | Shiraishi Kogyo Kaisha, Ltd. | 120 | 120 | 120 | 120 | 120 | 120 | 120 |
| Titanium oxide | Tipaque R-820 | Ishihara Sangyo Kaisha, Ltd. | 20 | 20 | 20 | 20 | 20 | 20 | 20 |
| Plasticizer | DIDP[2] | Kyowa Hakko Kogyo Co., Ltd. | 55 | 55 | 55 | 55 | 55 | 55 | 55 |
| Antisagging agent | Disparlon #6500[3] | Kusumoto Chemicals, Ltd. | 2 | 2 | 2 | 2 | 2 | 2 | 2 |
| Ultraviolet absorber | Tinuvin 327[4] | Ciba-Geigy Ltd. | 1 | 1 | 1 | 1 | 1 | 1 | 1 |
| Photostabilizer | Sanol LS-770[5] | Sankyo Co., Ltd. | 1 | 1 | 1 | 1 | 1 | 1 | 1 |
| Organotin Compound | Neostann U-220[6] | Nitto Kasei Co., Ltd. | | | | | | 1 | 1 |
| Component (B1) | Neostann U-50[7] | Nitto Kasei Co., Ltd. | | | | | | | |
| Component (B2) | Versatic 10[8] | Japan Epoxy Resin Co., Ltd. | 2.58 | 2.58 | 2.58 | | | | |
| | 2-Ethylhexanoic acid | Wako Pure Chem. Ind., Ltd. | | | | | 2.16 | 2.16 | |
| Component (C) | Diethylaminomethyltriethoxysilane[9] | AZmax Co., Ltd. | | | | | 1.25 | | 1.25 |
| | LS1455[10] | Shin-Etsu Chem. Co., Ltd. | | | | | | | |

TABLE 1-continued

| | | | | | | | | | |
|---|---|---|---|---|---|---|---|---|---|
| | Acetoxymethyl triethoxysilane[11] | AZmax Co., Ltd. | 1.18 | | | | | | |
| | A1120[12] | Japan Unicar Co., Ltd. | | | 1.11 | | | | |
| Component (D) | n-Octylamine | Wako Pure Chem. Ind., Ltd. | | | | | 0.65 | 0.65 | |
| | DEAPA[13] | Koei Chem. Co., Ltd. | 0.65 | 0.65 | 0.65 | | | | |
| Curability | SFT | (min) | 34 | 62 | 68 | 43 | 230 | 36 | 47 |

[1] Precipitated calcium carbonate
[2] Diisodecyl phthalate
[3] Fatty acid amide wax
[4] 2-(3,5-Di-t-butyl-2-hydroxyphenyl)-5-chlorobenzotriazole
[5] Bis(2,2,6,6-tetramethyl-4-piperidyl) sebacate
[6] Dibutyltin(IV) bisacetylacetonate; Metal(Sn) content: 27.5%
[7] Tin (II) neodecanoate; Metal (Sn) content: 22 to 24%
[8] Neodecanoic acid
[9] $Et_2NCH_2Si(OEt)_3$
[10] $H_2NC_2H_4NHCH_2Si(OMe)_3$
[11] $CH_3CO_2CH_2Si(OEt)_3$
[12] $H_2NC_2H_4NHC_3H_6Si(OMe)_3$
[13] 3-Diethylaminopropylamine When Neostann U-50 was used as the component (B1), addition of diethylaminomethyltriethoxysilane as the component (C) improved the curability (Experimental Examples 1 and 2). Also when neodecanoic acid or 2-ethylhexanoic acid were used as the component (B2), addition of the component (C) was observed to improve the curability (Experimental Examples 3 to 13).

On the other hand, the curability was not improved even by addition of a silicon compound (A1120) having a nitrogen atom on the γ-position carbon atom with respect to the silicon atom in place of the component (C)

Experimental Examples 6 and 11

Also when Neostann U-220, an organotin compound, was used as curing catalyst, no curability improvement effect was obtained even by addition of the component (C) (Experimental Examples 14 and 15).

Experimental Examples 16 to 18

In each of Experimental Examples 16 to 18, the reactive silicon group-containing polyoxyalkylene polymer (A-1) obtained in Synthesis Example 1 was used as the component (A); a filler, a plasticizer, a thixotropic agent, an ultraviolet absorber and a photostabilizer were weighed out respectively according to the prescriptions given in Table 2; and the all these ingredients were fully kneaded with a three-roll paint mill to yield the main part.

Then, in each of Experimental Examples 16 to 18, a dehydrating agent, an adhesion-imparting agent, the component (B), the component (C) and the component (D) were respectively weighed out as shown in Table 2, and these ingredients were mixed with the above described main part by stirring with a spatula for 3 minutes. For the purpose of approximately equalizing the curing times, the parts by weight of the component (B) was regulated, and the adhesion evaluation was thus carried out.

(Adhesion Test)

After mixing, the compositions thus obtained each were defoamed while being extended thinly with a spatula, put on various adherend substrates (anodized aluminum, aluminum, a steel plate, a stainless steel plate) so as to adhere to the adherend substrates and shaped to a thickness of 5 mm and an area size of 40 mm×10 mm. The curing compositions on the various substrates were aged at 23° C. for 7 days, and thereafter a 90 degree hand peel test was carried out. The failure modes of the respective cured substances were observed and the cohesion failure rates (CF rates) were investigated. The results thus obtained are shown in Table 2, wherein G denotes a case where the average value of the CF rates for the respective substrates was 60% or more, and P denotes a case where the average value concerned was less than 60%.

TABLE 2

| | | | Experimental Example | | |
|---|---|---|---|---|---|
| Composition (parts by weight) | | | 16 | 17 | 18 |
| Component (A) | | A-1 | 100 | 100 | 100 |
| Filler | Hakuenka CCR[1] | Shiraishi Kogyo Kaisha, Ltd. | 120 | 120 | 120 |
| Titanium oxide | Tipaque R-820 | Ishihara Sangyo Kaisha, Ltd. | 20 | 20 | 20 |
| Plasticizer | DIDP[2] | Kyowa Hakko Kogyo Co., Ltd. | 55 | 55 | 55 |
| Antisagging agent | Disparlon #6500[3] | Kusumoto Chemicals, Ltd. | 2 | 2 | 2 |
| Ultraviolet absorber | Tinuvin 327[4] | Ciba-Geigy Ltd. | 1 | 1 | 1 |
| Photostabilizer | Sanol LS-770[5] | Sankyo Co., Ltd. | 1 | 1 | 1 |
| Dehydrating agent | A-171[6] | Japan Unicar Co., Ltd. | 2 | 2 | 2 |
| Adhesion-imparting agent | A1120[7] | Japan Unicar Co., Ltd. | 3 | 3 | 3 |

TABLE 2-continued

|  | Composition (parts by weight) |  | Experimental Example | | |
|---|---|---|---|---|---|
|  |  |  | 16 | 17 | 18 |
| Component (B1)(B2) | Versatic 10[8] | Japan Epoxy Resin Co., Ltd. | 2 | 2.58 | 3 |
| Component (C) | Diethylaminomethyl-triethoxysilane[9] | AZmax Co., Ltd. | 1.25 | | |
|  | Acetoxymethyltri-ethoxysilane[10] | AZmax Co., Ltd. | | 1.18 | |
| Component (D) | DEAPA[11] | Wako Pure Chem. Ind., Ltd. | 1 | 1 | 1 |
| Curability | SFT | (min) | 60 | 72 | 75 |
| Adhesion |  |  | G | G | P |

[1] Precipitated calcium carbonate
[2] Diisodecyl phthalate
[3] Fatty acid amide wax
[4] 2-(3,5-Di-t-butyl-2-hydroxylphenyl)-5-chlorobenzotriazole
[5] Bis(2,2,6,6-tetramethyl-4-piperidyl) sebacate
[6] Trimethoxyvinylsilane
[7] $H_2NC_2H_4NHC_3H_6Si(OMe)_3$
[8] Neodecanoic acid
[9] $Et_2NCH_2Si(OEt)_3$
[10] $CH_3CO_2CH_2Si(OEt)_3$
[11] N,N-Diethyl-1,3-propanediamine As shown in Table 2, addition of the component (C) improved the adhesion.

As described above, a curing composition which includes (A) an organic polymer having silicon-containing groups capable of cross linking by forming siloxane bonds, (B) a metal carboxylate and/or carboxylic acid, and (C) a silicon compound having a hetero atom on the carbon atom in the α or β position with respect to the silicon atom gives a cured substance exhibiting a practical curability and having a satisfactory adhesion even though a non-organotin compound is used as a curing catalyst.

INDUSTRIAL APPLICABILITY

The curing composition of the present invention can be used as tackifiers, sealants for buildings, ships, vehicles and road, adhesives, mold forming materials, vibration-proof material, damping materials, soundproof materials, foaming materials, painting materials, spraying materials and the like. Additionally, the curing composition of the present invention can be used in various applications as liquid sealants to be used in materials for electric and electronic components such as backside sealants for solar cells, electric insulating materials such as insulating coating materials for use in electric wire and cable, elastic adhesives, powdery painting materials, casting materials, medical rubber materials, medical adhesives, medical instrument sealants, food packaging materials, sealants for joints in exterior materials such as sizing boards, coating materials, primers, electromagnetic wave shielding conductive materials, heat conducting materials, hot melt materials, electric and electronic potting agents, films, gaskets, various molding materials, antirust and waterproof sealants for edges (cut portions) of wire glass and laminated glass, vehicle components, electric appliance components, various machinery components and the like. Moreover, the curing composition of the present invention can adhere, by itself or with the aid of a primer, to a wide variety of substrates including glass, porcelain, woods, metals and molded resin substances, and accordingly, can be used as various types of hermetically sealing compositions and adhesive compositions.

The invention claimed is:

1. A curing composition which comprises:
(A) an organic polymer having one or more silicon-containing groups capable of cross linking by forming siloxane bonds and being one or more polymers selected from the group consisting of a polyoxyalkylene polymer, a saturated hydrocarbon polymer and a (meth)acrylate polymer,
(B) a tin carboxylate which is a non-organotin compound and in which the carbon atom adjacent to the carbonyl group is a quaternary carbon atom and/or a monocarboxylic acid, and
(C) a silicon compound having a hetero atom on the carbon atom in the α or β position with respect to the silicon atom.

2. The curing composition according to claim 1, in which the organic polymer as the component (A) has a number average molecular weight falling within a range from 500 to 50000, and has on average one or more silicon-containing groups per molecule thereof, each of the silicon-containing groups represented by the general formula (1):

$$-(SiR^1{}_{2-b}X_bO)_1-SiR^2{}_{3-a}X_a \quad (1)$$

wherein $R^1$ and $R^2$ are each independently an alkyl group having 1 to 20 carbon atoms, an aryl group having 6 to 20 carbon atoms, an aralkyl group having 7 to 20 carbon atoms, or a triorganosiloxy group represented by $(R')_3SiO-$, wherein R's are each independently a substituted or unsubstituted hydrocarbon group having 1 to 20 carbon atoms; Xs are each independently a hydroxyl or hydrolyzable group; a represents 0, 1, 2 or 3 and b represents 0, 1 or 2 with the proviso that a and b are not simultaneously 0; and 1 represents 0 or an integer of 1 to 19.

3. The curing composition according to claim 2, in which X is an alkoxy group.

4. The curing composition according to claim 1, wherein the polyoxyalkylene polymer is a polyoxypropylene polymer.

5. The curing composition according to claim 1, in which the organic polymer as the component (A) does not substantially comprise amide segments in the main chain skeleton thereof.

6. The curing composition according to claim 1, wherein the component (B) is a tin carboxylate which is a non-organotin compound and in which the carbon atom adjacent to the carbonyl group is a quaternary carbon atom and/or a monocarboxylic acid in which the carbon atom adjacent to the carbonyl group constituting the carboxylic acid is a quaternary carbon atom.

7. The curing composition according to claim 1, wherein the component (B) is tin carboxylate which is a non-organotin compound and in which the carbon atom adjacent to the carbonyl group is a quaternary carbon atom.

8. The curing composition according to claim 1, wherein the component (B) is a monocarboxylic acid.

9. The curing composition according to claim 1, wherein the component (C) is a silicon compound represented by the general formula (2):

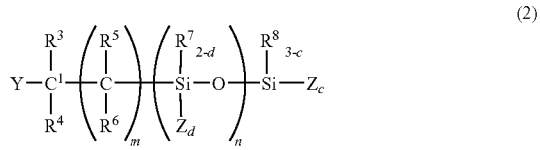

(2)

wherein $R^3$ to $R^6$ are each independently a hydrogen atom, or a substituted or unsubstituted monovalent hydrocarbon group having 1 to 20 carbon atoms; $R^7$ and $R^8$ are each independently an alkyl group having 1 to 20 carbon atoms, an aryl group having 6 to 20 carbon atoms, an aralkyl group having 7 to 20 carbon atoms, or a triorganosiloxy group represented by $(R'')_3SiO—$, wherein R''s are each independently a substituted or unsubstituted monovalent hydrocarbon group having 1 to 20 carbon atoms; Y is a substituent bonded to an adjacent carbon atom ($C^1$) through a hetero bond; Zs are each independently a hydroxyl or hydrolyzable group; c represents 0, 1, 2 or 3 and d represents 0, 1 or 2 with the proviso that c and d are not 0 simultaneously; m represents 0 or 1; and n represents 0 or an integer of 1 to 19.

10. The curing composition according to claim 9, wherein Y in the general formula (2) is a hetero substituent represented by $—NR^9{}_2$, $—OR^{10}$ or $—SR^{11}$, wherein two $R^9$s, $R^{10}$ and $R^{11}$ are each independently a hydrogen atom or a substituted or unsubstituted monovalent hydrocarbon group, or by $—N=R^{12}$ wherein $R^{12}$ is a substituted or unsubstituted divalent hydrocarbon group.

11. The curing composition according to claim 10, wherein Y in the general formula (2) is a nitrogen substituent represented by $—NR^9{}_2$ or $—N=R^{12}$ wherein two $R^9$s and $R^{12}$ are the same as described above.

12. The curing composition according to claim 9, wherein m in the general formula (2) is 0.

13. The curing composition according to claim 1, in which the curing composition comprises 0.01 to 20 parts by weight of the component (B) and 0.01 to 10 parts by weight of the component (C) in relation to 100 parts by weight of the component (A).

14. The curing composition according to claim 1, which further comprises a component (D), wherein component (D) is an amine compound.

15. The curing composition according to claim 14, in which the curing composition comprises 0.01 to 20 parts by weight of the component (D) in relation to 100 parts by weight of the component (A).

16. A one-part curing composition which comprises the curing composition according to claim 1.

* * * * *